(12) United States Patent
Miniard

(10) Patent No.: US 11,151,856 B2
(45) Date of Patent: Oct. 19, 2021

(54) DISTRIBUTED SECURITY SYSTEM USING POSITION TRACKING

(71) Applicant: Jerry M. Miniard, Fort Mitchell, KY (US)

(72) Inventor: Jerry M. Miniard, Fort Mitchell, KY (US)

(*) Notice: Subject to any disclaimer, the term of this patent is extended or adjusted under 35 U.S.C. 154(b) by 0 days.

(21) Appl. No.: 16/464,535

(22) PCT Filed: Nov. 28, 2017

(86) PCT No.: PCT/US2017/063372
§ 371 (c)(1),
(2) Date: May 28, 2019

(87) PCT Pub. No.: WO2018/102280
PCT Pub. Date: Jun. 7, 2018

(65) Prior Publication Data
US 2019/0378391 A1    Dec. 12, 2019

Related U.S. Application Data

(60) Provisional application No. 62/443,309, filed on Jan. 6, 2017, provisional application No. 62/427,483, filed (Continued)

(51) Int. Cl.
*G08B 21/02*      (2006.01)
*H04W 4/02*       (2018.01)

(52) U.S. Cl.
CPC ..... *G08B 21/0227* (2013.01); *G08B 21/0261* (2013.01); *H04W 4/023* (2013.01)

(58) Field of Classification Search
CPC ............ G08B 21/0227; G08B 21/0261; G08B 21/0269; G08B 13/1965; H04W 4/023; G06Q 10/10
(Continued)

(56) References Cited

U.S. PATENT DOCUMENTS 7,034,684 B2 *   4/2006   Boman ............... G08B 13/1427
                                                    340/539.11
7,696,887 B1     4/2010   Echavarria
(Continued)

OTHER PUBLICATIONS

International Searching Authority, Search Report and Written Opinion issued in PCT/US2017/063372 dated Feb. 9, 2018 (14 pages).

*Primary Examiner* — Adnan Aziz
(74) *Attorney, Agent, or Firm* — Wood Herron & Evans LLP

(57) ABSTRACT

Systems, methods, and computer program products for securing a device or an asset attached thereto. The positions of a plurality of devices are monitored, and based on the positions, a determination is made as to whether a threshold condition has been violated. If the threshold condition has been violated, a notification signal is transmitted from a monitored device to one or more of the other devices to alert a responder that the monitored device is at risk of being lost. In response to the threshold condition being violated, the monitored device may also record and/or transmit data for display to the responder to help prevent the loss, or facilitate the recovery of the monitored device and/or an asset attached to the monitored device.

29 Claims, 19 Drawing Sheets

Related U.S. Application Data on Nov. 29, 2016, provisional application No. 62/546,191, filed on Aug. 16, 2017.

(58) Field of Classification Search
USPC ............ 340/539.11, 539.13, 539.15, 539.21, 340/686.6, 573.1, 573.4
See application file for complete search history.

(56) References Cited

U.S. PATENT DOCUMENTS

| | | | |
|---|---|---|---|
| 8,054,177 B2 | 11/2011 | Graves et al. | |
| 8,200,186 B2 | 6/2012 | Ashley, Jr. et al. | |
| 8,810,392 B1* | 8/2014 | Teller | G08B 21/24 235/385 |
| 9,070,275 B1 | 6/2015 | Green et al. | |
| 9,210,534 B1 | 12/2015 | Matthieu et al. | |
| 9,285,484 B2 | 3/2016 | Shima | |
| 9,286,783 B1* | 3/2016 | Teller | G08B 21/24 |
| 9,342,970 B2 | 5/2016 | Green et al. | |
| 9,369,847 B2 | 6/2016 | Borghei | |
| 9,420,015 B2 | 8/2016 | Cherry et al. | |
| 9,498,163 B2 | 11/2016 | Frieder et al. | |
| 9,504,425 B2* | 11/2016 | Jooste | A61B 5/6898 |
| 9,538,325 B2 | 1/2017 | Friedman et al. | |
| 9,538,329 B1 | 1/2017 | Vivathana | |
| 9,654,925 B1* | 5/2017 | Solinsky | G08B 21/0261 |
| 9,949,302 B2* | 4/2018 | Price | H04W 52/24 |
| 9,978,030 B2* | 5/2018 | Lim | G06Q 10/0633 |
| 2005/0068169 A1 | 3/2005 | Copley et al. | |
| 2005/0280546 A1* | 12/2005 | Ganley | G08B 13/1427 340/573.4 |
| 2008/0088437 A1* | 4/2008 | Aninye | G07C 9/28 340/539.13 |
| 2008/0186166 A1* | 8/2008 | Zhou | G01S 5/0027 340/539.13 |
| 2010/0002846 A1* | 1/2010 | Ray | G10L 13/043 379/37 |
| 2010/0148947 A1 | 6/2010 | Morgan et al. | |
| 2010/0267361 A1 | 10/2010 | Sullivan | |
| 2012/0116861 A1* | 5/2012 | Dobyns | H04W 4/023 705/14.34 |
| 2012/0223834 A1 | 9/2012 | Hyatt | |
| 2013/0328678 A1* | 12/2013 | Shechter | G08B 21/22 340/539.13 |
| 2014/0141714 A1* | 5/2014 | Ghosh | H04W 4/80 455/39 |
| 2014/0266710 A1* | 9/2014 | Nguyen | H04M 1/00 340/539.13 |
| 2016/0027292 A1* | 1/2016 | Kerning | H04W 4/90 455/404.2 |
| 2016/0358432 A1* | 12/2016 | Branscomb | H04L 61/35 |
| 2016/0379459 A1* | 12/2016 | Trang | G08B 21/24 340/457 |
| 2017/0111102 A1* | 4/2017 | Fan | H04B 7/18504 |
| 2017/0237820 A1* | 8/2017 | Scarborough | G06Q 10/00 709/226 |
| 2017/0258401 A1* | 9/2017 | Volpe | A61N 1/37247 |
| 2017/0372580 A1* | 12/2017 | Vivathana | G08B 21/0261 |
| 2018/0025617 A1* | 1/2018 | Hesford | G08B 25/001 340/506 |

* cited by examiner

DISTRIBUTED SECURITY SYSTEM USING POSITION TRACKING

CROSS-REFERENCE TO RELATED APPLICATIONS

This application claims the benefit of and priority to U.S. Application No. 62/427,483, filed Nov. 29, 2016, U.S. Application No. 62/443,309, filed Jan. 6, 2017, and U.S. Application No. 62/546,191, filed Aug. 16, 2017, and co-pending Intl. Application No. PCT/US2017/063372, filed Nov. 28, 2017, the disclosures of which are incorporated by reference herein in their entireties.

BACKGROUND

The present invention generally relates to position detection, and specifically to systems, methods, and computer program products for securing assets, areas, and persons based on the detected positions and/or movements of one or more devices.

People often carry multiple electronic devices, either on their persons, in vehicles, or in various carry-bags. These devices typically have considerable value, both in the replacement cost of the device and the value of the information stored on the device. For example, business travelers may carry a smart phone, a laptop computer, and a tablet computer. The confusion caused by unfamiliar surroundings and the distractions of travel can result in persons leaving one or more of their devices behind when changing locations or modes of transportation. The loss of a device can be costly both in time wasted trying to recover the device, the cost of replacement, and the anxiety of losing control over valuable personal information.

Thus, there is a need for systems, methods, and computer program products that prevent persons from losing track of their electronic devices, that help them recover the devices if they are lost, and that increase the security and safety of persons and their assets.

SUMMARY

In an embodiment of the invention, a security system is provided. The security system includes a first device and a second device in communication with the first device. The first device is configured to determine its position, determine if its position causes a violation of a threshold condition, and in response to its position causing the violation of the threshold condition, transmit a notification signal. The second device is configured to receive the notification signal, and generate an alert signal in response thereto.

In another aspect of the invention, the position of the second device is determined with respect to the position of the first device, or with respect to a fixed position.

In another aspect of the invention, the threshold condition consists includes the first device being outside of a first predetermined area, crossing a virtual boundary, being within a second predetermined area, being more than a predetermined distance from the second device, or movement of the first device in combination with the first device being more than the predetermined distance from the second device.

In another aspect of the invention, the predetermined distance from the second device is determined based at least in part on whether the first device is in a safe zone.

In another aspect of the invention, the second predetermined area is downloaded from a database of prohibited areas from which the first device is to be excluded.

In another aspect of the invention, the second device is an electronic device carried by a user of the first device.

In another aspect of the invention, the first device is one of a plurality of first devices in communication with the second device, and the second device generates the alert signal in response to receiving the notification signal from any of the first devices.

In another aspect of the invention, the first device is configured to collect environmental data in response to the violation of the threshold condition.

In another aspect of the invention, the environmental data includes an image of an area proximate to the first device.

In another aspect of the invention, the second device comprises an autonomous robot that is configured to move toward the position of the first device in response to the violation of the threshold condition.

In another aspect of the invention, the notification signal includes instructions for responding to the alert signal.

In another aspect of the invention, in response to not receiving a confirmation signal from the second device within a response interval, the first device transmits the notification signal to a third device.

In another aspect of the invention, the first device transmits the notification signal to the second device through a network.

In another embodiment of the invention, a method of securing the device or an asset attached to the device is provided. The method includes determining the position of the first device, determining if the position of the first device causes the violation of the threshold condition. In response to the position of the first device causing the violation of the threshold condition, the method further includes transmitting the notification signal from the first device to the second device, and generating the alert signal in response to receiving the notification signal at the second device.

In another aspect of the invention, the method further includes collecting the environmental data in response to the violation of the threshold condition.

In another aspect of the invention, the second device comprises the autonomous robot, and the method further includes moving the autonomous robot toward the position of the first device in response to the violation of the threshold condition.

In another aspect of the invention, the method further includes, in response to not receiving the confirmation signal from the second device within the response interval, transmitting the notification signal to the third device.

In another embodiment of the invention, a computer program product for securing the device or the asset attached to the device is provided. The computer program product includes a non-transitory computer readable storage medium containing program code that, when executed by one or more processors, causes the one or more processors to determine the position of the first device, determine if the position of the first device causes the violation of the threshold condition, and response to the position of the first device causing the violation of the threshold condition, transmit the notification signal to the second device. In response to receiving the notification signal at the second device, the program code further causes the one or more processors to generate the alert signal.

The above summary presents a simplified overview of some embodiments of the invention in order to provide a basic understanding of certain aspects of the invention described herein. The summary is not intended to provide an extensive overview of the invention, nor is it intended to identify any key or critical elements or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the invention are directed to security systems that track the position and/or movement of devices, and determine if the position and/or movement of one or more of the devices is indicative of a potential loss or theft of the device. To this end, one or more threshold conditions may be defined in the security system, and the data received from the devices used to determine if any of the threshold conditions have been violated. In response to a violation, the security system may transmit notification signals to one or more of the devices to alert a user or other responder that a device is at risk. The security system may further use the data received from the electronic devices to display information to the user to prevent the loss, or facilitate the recovery of, the device at risk.

Figure 1:
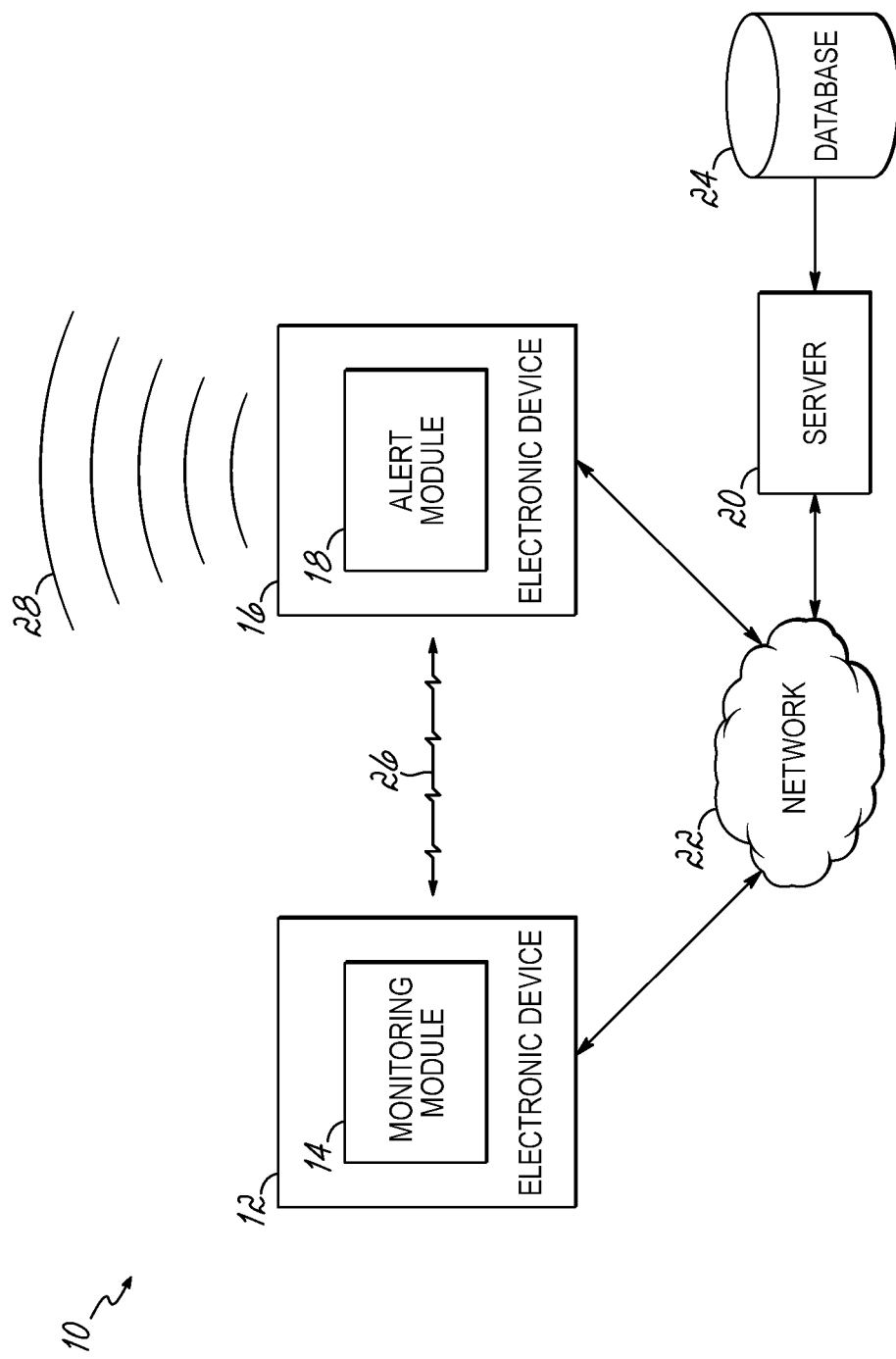
FIG. 1 is a diagrammatic view of an exemplary security system including an electronic device having a monitoring module, an electronic device having an alert module, a server, and a database.

Turning now to the figures, FIG. 1 illustrates an exemplary security system 10 in accordance with an embodiment of the invention that includes an electronic device 12 having a monitoring module 14, and an electronic device 16 having an alert module 18. Each of the electronic devices 12, 16 may be a portable computing device, such as a smart phone, smart watch, laptop, tablet computer, media player, or any other computing device that can detect its position and/or movement and communicate that position and/or movement to another electronic device. Each module 14, 18 may comprise software, firmware, and/or hardware that provides a function to, or increases the capability of, the electronic device 12, 16 on which the module resides. The monitoring module 14 and alert module 18 may operate autonomously, in cooperation with each other, and/or in communication with a server 20 or other external resource over a network 22, to provide certain features of the security system 10. The network 22 may include one or more private or public data networks (e.g., the Internet) that enable the exchange of data between devices connected to the network 22.

The server 20 may be in communication with a database 24 to store and manage data received from the electronic devices 12, 16. Data received from the electronic devices 12, 16 may include position data (geographical position, e.g., latitude and longitude, relative position with respect to another device, distance from another device or geographical position, and/or orientation, etc., movement data (e.g., velocity, acceleration, etc.), environmental data (e.g., data indicative of temperature, humidity, pressure, ambient noise level, etc.), and device status data (e.g., data indicative of remaining battery level, wireless signal strength, etc.). Data related to position and/or movement may be referred to collectively as "tracking data".

The monitoring module 14 may be configured to determine if a threshold condition has been violated, e.g., the electronic device 12 has moved outside of an allowable predetermined area, is beyond a predetermined distance from electronic device 16, is in a prohibited position, and/or has a prohibited orientation, velocity, and/or acceleration. In response to the monitoring module 14 determining that the threshold condition has been violated, the monitoring module 14 may cause the electronic device 12 to transmit a notification signal 26 to the alert module of electronic device 16. The notification signal 26 may indicate that the threshold condition has been violated, and may be transmitted to the electronic device 16 directly (as depicted), or through an intervening device such as the server 20 and/or using the network 22. For example, the notification signal 26 may be transmitted directly to the electronic device 16 when the devices 12, 16 are close enough to use a short-range communication protocol (e.g., Bluetooth), and using a communication protocol provided by the network 22 (e.g., Long-Term-Evolution (LTE)) if the devices 12, 16 are too far apart to use the short-range communication protocol.

In response to the electronic device 16 receiving the notification signal 26, the alert module 18 may generate an alert signal 28 that indicates the threshold condition has been violated, e.g., that the position of the electronic device 12 has exceeded an allowable threshold. The alert signals 28 may include any audible, visual, vibratory, or other signal that can be detected by a user of the device to indicate the threshold condition has been violated. In an alternative embodiment, the alert signal 28 may be an electronic signal that is transmitted to another device to notify a user of the device or an application running on the device of the violation.

Although each electronic device 12, 16 is depicted a having either the monitoring module 14 or alert module 18 for purposes of describing the illustrated embodiment, each of the electronic devices 12, 16 may include both modules 14, 18. Accordingly, either electronic device 12, 16 may provide the monitoring and/or alert functions of the security system 10 depending on which electronic device 12, 16 has caused the threshold condition to be violated. One or more of the monitoring and alert modules 14, 18 may also reside on the server 20.

The electronic device 12 may be associated with an asset, such as an item or person, so that the monitoring module 14 monitors the position of the asset. For example, the electronic device 12 may be physically coupled to the asset, e.g., carried in a pocket of an item of clothing worn by a person or located in a piece of luggage. Another example of coupling between the electronic device 12 and the asset may be achieved by positioning the electronic device 12 within a distance from the asset so that the electronic device 12 can detect the position of the asset, e.g., via a Bluetooth signal.

The monitoring module 14 may determine the threshold condition has been violated, for example, in response to the asset associated with the electronic device 12 being in a position outside of a predetermined area or that is beyond an allowable distance from electronic device 16. For example, the monitoring module 14 may generate a virtual boundary that defines the predetermined area in which the asset may move, e.g., an area within a radius of a fixed position. This radius may be defined, for example, by a range at which a selected communication protocol transmitted from the electronic device 16 can be received by the electronic device 12 being monitored. This may allow the range to be adjusted based on the selection and/or power setting of the communication protocol used. In other cases, the monitoring module 14 may generate the virtual boundary using a suitable position detection system, such as a Global Positioning Satellite (GPS) system. In the case of a GPS or similar system, the monitoring module 14 may define the virtual boundary as a geo-fence using longitude, latitude, and/or altitude coordinates. The monitoring module 14 may then determine that the asset has travelled beyond the virtual boundary when the GPS coordinates associated with the asset are outside the boundary defined by the geo-fence.

By way of example, the electronic device 12 may be associated with a nursing home resident suffering from memory loss. The monitoring module 14 may generate, or otherwise be provided with (e.g., by downloading a file from the server 20), a virtual boundary that corresponds to a property line of the nursing home. The monitoring module 14 may then track the GPS coordinates of the nursing home resident as the nursing home resident moves about. By comparing the GPS coordinates to the virtual boundary coordinates, the monitoring module 14 may determine whether the nursing home resident has moved beyond the property line of the nursing home.

A plurality of electronic devices 12 may be used in combination for parents, field trips, tourism, and other group scenarios. For example, a group leader (e.g., a teacher) may associate an electronic device 12 with each member (e.g., a person or tracked item) of a group to monitor relational positions of the members relative to each other and/or to the group leader. A user interface may be configured to allow the group leader to set predetermined threshold conditions for each member of the group. The user interface may be provided by one or more of the electronic devices 12 of persons in the group, the electronic device 16 of the group leader, or some other computing system in communication with the electronic devices 12, 16.

The threshold conditions may include the relative position of the electronic device 12 to other electronic devices 12 in the group and/or the electronic device 16 of the group leader. The threshold conditions may also have a time dependency. For example, all the persons in the group may be required to be in a specified location (e.g., a dormitory) after a curfew, or within a smaller distance of the group leader (e.g., the length of a bus) after a scheduled departure time. In addition, the alert module 18 may be configured to verify compliance (e.g., that all persons are in the dormitory at beginning of the curfew) in addition to alerting in response to a violation of a threshold condition.

The alert module 18 may generate the alert signal 28 if a threshold condition is violated, e.g., by one or more of the electronic devices 12 moving too far from the group leader. The notification signal 26 and/or alert signal 28 may be received by a responder. The responder may be a person (e.g., the group leader), a computing system that provides an automated response, a device that makes decisions using artificial intelligence, an agent at a monitoring company, or any other suitable responsive entity. The responder may have an allotted amount of time after receiving the notification signal 26 and/or alert signal 28 to confirm reception and/or execute a response plan or other set of instructions. If a confirmation signal indicating the notification signal 26 has been received and/or the instructions have been executed within the allotted time, the electronic device 12 and/or server 20 may transmit the notification signal 26 to an electronic device 16 associated with another responder. The order in the which the notification signal 26 is transmitted to the electronic devices 16 may be defined, for example, by a hunt list stored in the database 24.

An illustration of the above applications may be provided by a parent taking one or more children to a mall. The parent may set a maximum distance that any one child can separate from the parent before an alert signal 28 is generated by the parent's electronic device 16. This distance may be set by the parent entering data or selecting predetermined choices on the user interface of the electronic device 16. The electronic device 16 may warn the parent that a child is wandering off in response to the electronic device 12 associated with the child violating the threshold condition, e.g., the electronic device 12 exceeding the allowable distance from the electronic device 16 of the parent.

Many types of selectable predetermined threshold conditions may be provided by the user interface. For example, the user interface may include a threshold condition that defines a maximum allowable distance between each electronic device 12 and the next closest electronic device 12 in the group. Another threshold condition may define a relationship between the group members e.g., an allowable distance between each group member and a center of gravity of the group or a sub-set of the group. The selectable threshold condition feature may be used in many ways by group leaders (e.g., teachers, tour group guides, body guards) to manage groups (e.g., children, senior citizens, dignitaries, etc.) for monitoring and safety (e.g., during a field trip, while in a foreign country, at an event, within a classroom, etc.).

The user interface may allow selection of additional positional, motion, and/or environmental limitations to define threshold conditions. This feature may allow the system to take advantage of information from sensors in the electronic device 12 and/or structures/objects (real or virtual) external to the electronic device 12 from which the electronic device 12 can obtain information, such as the Internet. Electronic devices 12 may also be coupled to a drone or other unmanned craft to improve position monitoring and/or to provide streaming video to the server 20 and/or one or more of the electronic devices 12, 16.

Embodiments of the invention may allow the parent to identify the position of the child or track the child's position on their electronic device 16. To this end, each electronic device 12, 16 may transmit its position to one or more of the other devices in the group and/or to the server 20. This may allow one or more of the group leader and/or members to view the position of the other members of the group on their device in real time. The ability to view the position of other members of the group may be restricted to certain devices, e.g., a device from which a group leader or system administrator has logged into an account authorized to access the position of other devices. The alert module 18 may also challenge the group leader to enter a code or other information to thwart unauthorized users from obtaining information about the positions of the group members by stealing the leader's electronic device 16.

As another example, a responder may monitor the progress, completion of, or deviation from a route planned for person to and/or from a specific geographic location, e.g., while walking to school. The responder may add multiple members to a group that is traveling the same route. An electronic device 12 may be assigned to each member of a group, including the group leader, to monitor the relational position of the members relative to each other and/or the coordinates of the destination. The user interface may allow the responder to set threshold conditions for each member of the group. The threshold conditions for each member may include a condition based on their position relative to the coordinates of other members travelling along the route and/or of waypoints on the route.

The real-time position of each member of the group as represented by the associated electronic device 12 and the destination coordinates may be displayed on the device 16 of the group leader or on any other authorized electronic device. Threshold conditions may relate to deviations from an estimated time of arrival at the destination, unacceptable route deviations, and/or distance from one or more of the other group members. A threshold condition relating to an arrival or departure from a geographic location may cause the system to notify the group leader that the member has arrived or departed from the location, such as home, work, school, sporting practice, church, a neighbor's house, etc. Multiple routes may be defined (e.g., preprogrammed) in the system for a member to return home or begin a route to a second location. Group members may include assets to which an electronic device 12 has been attached to protect the asset against theft or loss. For example, a child may have one or more additional electronic devices 12 attached to their possessions, e.g., a coat or backpack. This may allow one or more of the group leader and/or members to determine if anyone has become separated from one of their possessions.

The user interface may be programmed to exclude certain geographic areas from a route, such as dangerous environments, conditions, or situations. The user interface may be configured to provide potential areas to be excluded, for example, by linking to a database that stores the residential addresses of known sex offenders, felons, or criminals subject to house arrest, the locations of busy streets, construction zones, or other prohibited areas. The user interface may also provide the user with positive verification that the threshold conditions have been satisfied. For example, an alert signal 28 may also be generated if each member of a group reaches the destination within a predetermined time limit, thereby notifying the group leader that everyone has arrived safely.

Advantageously, widespread use of the security systems described herein accompanied by notice to the public that the system is in use (such as signage indicating security systems and/or video surveillance is in use) could have a deterrent effect that prevents a member of the group from attack and/or theft.

In yet another example, family, friends, and/or other responsible parties may use embodiments of the invention to independently monitor the activity of a person in a care facility. This may include the movement or non-movement of the monitored person. This monitoring may be for safety, compliance with approved treatment (e.g., the person likely did not attend a scheduled physical therapy treatment if they did not leave their room), tracking and/or locating the monitored person if they voluntarily leave the facility or are taken out of the facility by a family member, etc. This feature may enable caregivers to take short breaks or complete chores without the person being cared wandering off.

The monitoring module 14 may receive data from an accelerometer, gyroscope, or other type of motion sensor of electronic device 12, and may use this data to supplement or replace data received from the other position detection systems. This movement data may also be used to determine whether the orientation of the asset associated with the electronic device has changed beyond a threshold condition. For example, the electronic device 12 may be associated with a piece of jewelry displayed at a jewelry store. Because the jewelry may normally be in a stationary position, movement or acceleration of the jewelry may be an indication that the jewelry is being stolen. Thus, to prevent theft, the monitoring module 14 may have a threshold condition that is violated if the acceleration of the electronic device 12 associated with the jewelry exceeds a predetermined level. Acceleration measured over time may also be used to determine velocity and position of the jewelry.

A change in the orientation of the electronic device 12, as indicated by the motion sensor, could also be used signal that someone has gained unauthorized access to a shipping container. For example, a shipment of computer tablets could wake up from hibernation in response to detecting a change in orientation. If the change in orientation of one of the tablets was determined to be relative to the other tablets in the container, i.e., was not due to movement of the entire container, the tablet could transmit a notification signal to an electronic device of the captain of the ship, or some other person at the shipping company, indicating that someone may have entered the shipping container. In another scenario involving monitoring of electronic devices themselves, a change in the relative orientation of a tablet computer in a display relative to other tablet computers in the store may trigger transmission of a notification signal to a responder (e.g., the store manager) if someone moves a tablet computer after closing time.

By way of another example, the monitoring module 14 may determine when the orientation of the jewelry has changed from its normal state. When the orientation of the jewelry changes beyond that allowed by a threshold condition, the monitoring module 14 may determine that the threshold condition has been violated. Whether the threshold condition has been violated may be based on one or more of the position and orientation of the electronic device 12 associated with the asset relative to the electronic device 16 of the responder. The monitoring module 14 may determine this threshold condition as a position or location of the electronic device 12 relative to that of the electronic device 16, e.g., that the asset is beyond an allowed distance or angle relative to the position/orientation of the electronic device 16. The electronic device 16 may be associated with a security guard at a jewelry store, and the monitoring module 14 may determine when the jewelry is beyond an allowed distance from the position of the electronic device 16 so that the security guard can act to secure the jewelry.

The responder alerted by the alert signal 28 of electronic device 16 may execute a graduated response. This graduated response may be determined based on the alert signal 28 alone, or the alert signal 28 in combination with a signal received from another source independent of the alert signal 28, e.g., a home alarm system. The response may be defined in a systematic and/or programmed manner based on mathematical calculations, computer instructions, and/or other algorithms, to execute predetermined actions or tasks. The electronic device 16 may be coupled to the responder, or positioned sufficiently proximate to the responder, so that the responder can ascertain the presence of the alert signal 28 generated by the electronic device 16. The alert signal 28 may be used to convey information to the responder, such as an indication that the notification signal 26 has been received, and/or the content of the notification signal 26.

The alert module 18 may allow the user to designate the responder that receives the alert signal 28 (e.g., a person or electronic device), and the allowed response interval before a second alert signal 28 is generated. If a selected number of alert signals 28 are generated without being acknowledged, a notification signal 26 may be transmitted to another electronic device 16 associated with a different responder. The generation of alert signals 28 may proceed in accordance with the responders, response intervals, and/or number of alerts per responder as defined by the user until an alert signal 28 is acknowledged, and an appropriate response has been executed.

By way of example, in the jewelry store scenario described above, the asset associated with the electronic device 12 may be the jewelry, the responder associated with the electronic device 16 may be the security guard, and the predetermined virtual boundary may be a specified area within the store, such as an area proximate to a display case. The monitoring module 14 may monitor the position of the electronic device 12 associated with the jewelry, and determine whether the jewelry has been moved beyond the boundary of the specified area. If unauthorized movement of the jewelry is detected, the monitoring module 14 may trigger the notification signal 26 to notify the alert module 18 that the jewelry has been moved in a manner that violates a threshold condition. In response to the electronic device 16 receiving the notification signal 26, the alert module 18 may cause the electronic device 16 to generate the alert signal 28. The alert signal 28 may, in turn, alert the security guard that the jewelry has been moved beyond the authorized area. The security guard may then determine the current position of the jewelry, and return the jewelry back to its original position in the jewelry case.

The monitoring module 14 and the alert module 18 may send and receive signals based on a set of instructions executed by their respective devices. For example, the alert module 18 may transmit an update signal to the monitoring module 14 that notifies the monitoring module 14 as to whether the alert signal 28 has been generated, the responder has executed the prescribed action, and so on. The monitoring module 14 may receive the update signal and then execute additional instructions based thereon.

The electronic devices 12, 16 may also change roles based on a set of instructions on each of the devices. For example, the electronic device 12 may initially assume the role of generating the notification signal 26 and the electronic device 16 may assume the role of generating the alert signal 28. However, the electronic device 12 may interchange roles and assume the role of generating the alert signal 28 while the electronic device 16 may assume the role of generating the notification signal 26. The monitoring module 14 may also exchange signals with other devices independent of the electronic devices 12, 16, such as the server 20. These additional signals may enable separate and/or independent action to be executed in addition to the graduated actions of the primary responder initiated by the alert signal 28. The additional signals may provide improved and/or redundant security to the asset associated with the electronic device 12, e.g., through a secondary responder such as the police.

Figure 2:
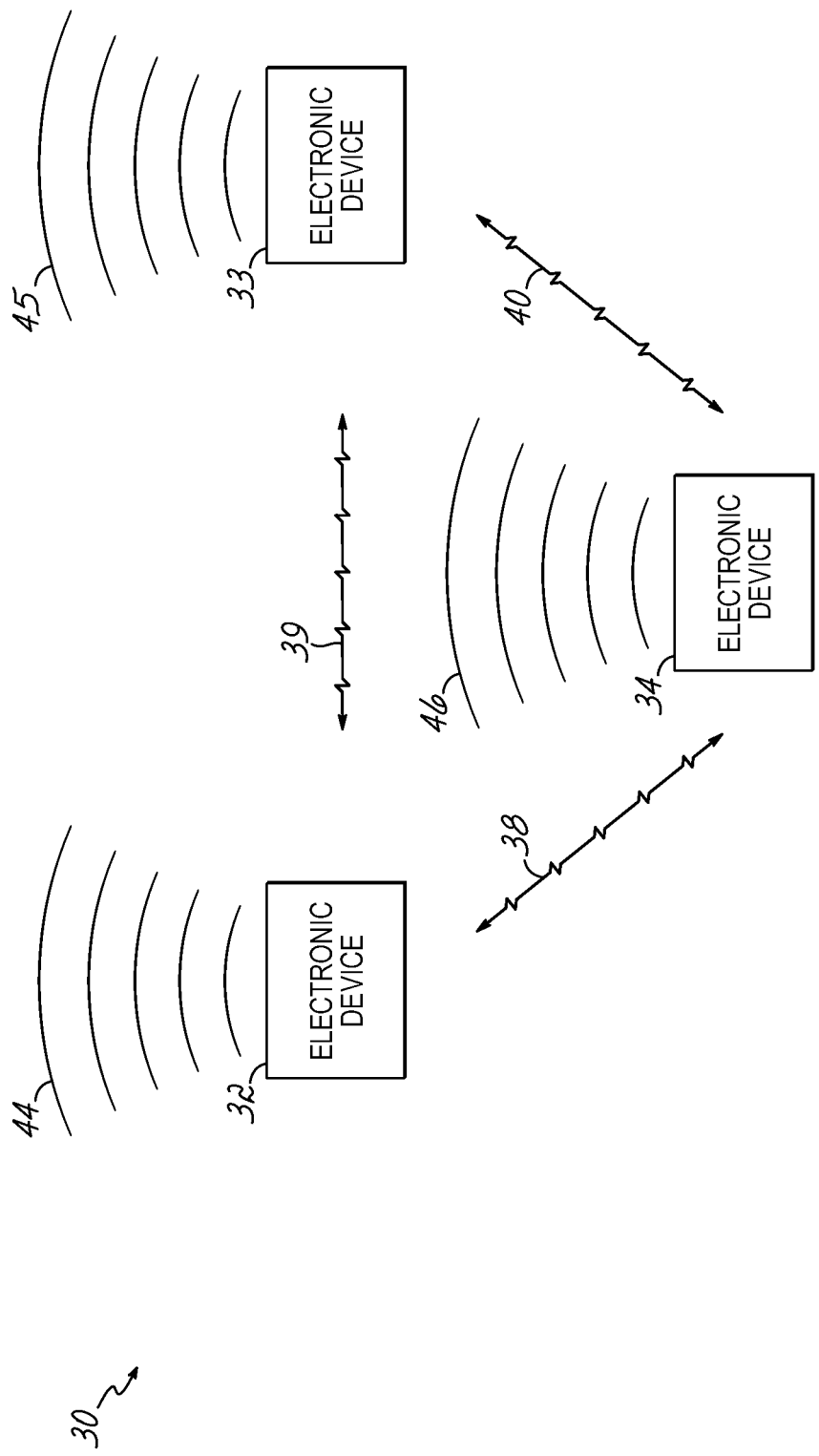
FIG. 2 is a diagrammatic view of a security system including a plurality of electronic devices transmitting and receiving notification signals indicative of a violation of a threshold condition.

FIG. 2 illustrates an exemplary security system 30 in accordance with another embodiment of the invention. The security system 30 may include a plurality of electronic devices 32-34 in communication with each other, either directly or through a network, using a suitable communication protocol, e.g., Bluetooth, Bluetooth Low Energy (BLE), Wi-Fi, Radio-Frequency Identification (RFID), Near Field Communication (NFC), LTE, etc. The electronic devices 32-34 may be configured to interchangeably detect when one or more of the electronic devices 32-34 is in violation of a threshold condition, such as being positioned outside an allowed area, beyond an allowed distance from one or more of the other devices 32-34, or having an orientation that outside an allowed range of orientations. The allowed areas, distances, and/or ranges of orientations may be relative to a fixed position (i.e., absolute), or relative to another of the devices 32-34 so that the devices 32-34 are virtually tethered. To this end, each of the electronic devices 32-34 may include running instances of the monitoring and/or alert modules 14, 18.

The electronic device 32-34 that detects a violation of the threshold condition may transmit a respective notification signal 38-40 to one or more of the remaining electronic devices 32-34. The notification signal 38-40 may indicate to the remaining electronic devices 32-34 that the electronic device in question is outside the allowed area, beyond the allowed distance, and/or beyond the allowed range of orientations. In response to receiving the notification signal 38-40, one or more of the remaining electronic devices 32-34 may generate a respective alert signal 44-46 to indicate that the electronic device in question has caused a threshold condition to be violated.

By way of example, the security system 30 may be operating in a public place, such as an airport. Electronic device 32 may be a smart watch worn on the wrist of the user, electronic device 33 may be a smart phone positioned on an arm of a chair that the user is sitting in, and electronic device 34 may be a laptop computer positioned in the lap of the user. Thus, the electronic devices 32-34 may initially be positioned within a threshold distance of, and have a specific orientation relative to, each other. In any case, the distance between by comparing the absolute positions of the devices (e.g., as determined using GPS) or based on signals transmitted directly between the devices 32-34 (e.g., the received signal strength of BLE signals).

A sufficient change in position and/or orientation of any of the electronic devices 32-34 relative to each other may indicate that the device in question has been moved without the knowledge of the user of the device. Such a change in position and/or orientation may indicate an increased risk that the electronic device 32-34 is being stolen or inadvertently left behind by the user. For example, the smart watch may be positioned on the user's wrist as the user sits in the chair, in which case the electronic device 32 would have a limited range of motion relative to the user. Any positioning of the smart phone beyond a threshold distance from the smart watch, especially if the laptop remains in the user's lap, might indicate that an unauthorized person has taken possession of the smart phone and is walking away. In another example, the smart phone may have fallen off the arm of the chair and to the floor without the user noticing.

In response to the position of the smart phone moving beyond the allowable distance from the smart watch and/or the laptop, a monitoring module 14 in the form of an application running on the smart phone may cause the electronic device 33 to transmit a notification signal 26. The notification signal 26 may be received by one or more of the smart watch or the laptop, and may notify an alert module 18 in the form of an application running on the smart watch or laptop that the smart phone has moved beyond the allowable distance from the smart watch and/or the laptop.

In response to receiving the notification signal 26, the alert module 18 on the smart watch and/or the laptop may generate a corresponding alert signal 28 to alert the user that the smart phone is beyond the allowable distance from the smart watch and/or laptop. The user may then determine where the smart phone is, and reposition the smart phone within the allowable distance of the smart watch and/or laptop. In addition to alerting the user of movement of the smart phone outside the allowable distance, the smart watch may provide real time geo-positioning or directional tracking information to facilitate determination of the location of the smart phone. The user may then quickly contact the authorities and/or identify the unauthorized person that has the smart phone.

Each of the electronic devices 32-34 may interchangeably transmit and/or receive notification signals 38-40, and generate alert signals 44-46. To this end, an application running on each of the electronic devices 32-34 may provide one or more of the monitoring module 14 and/or alert module 18. Whenever any of the electronic devices 32-34 is positioned and/or oriented beyond any of the allowable positions and/or orientations, the corresponding monitoring module 14 of the device may transmit the notification signal 38-40 to the alert modules 18 in the other electronic devices 32-34.

In another scenario involving the above operating environment, the user may reposition the laptop from his lap to the ground to retrieve the smart phone from the unauthorized person, use the restroom, or any other reason that would cause the user to be away from their seat temporarily. While the user is away, another unauthorized person may take possession of the unattended laptop and begin moving the laptop away. In this scenario, the laptop is both in motion and beyond the allowable distance from of the smart phone and/or smart watch. If the threshold conditions include an assumption that the smart watch is likely with the user, movement of the laptop while the smartwatch is beyond the allowable distance (as opposed to sitting stationary on the floor while the user is away) may indicate that the laptop has been stolen.

Likewise, if a person moves the laptop beyond the threshold distance from the smart phone and the smart watch, the laptop may transmit a notification signal 26. In response to receiving the notification signal 26, the smart phone and/or smart watch may generate an alert signal 28. The alert signal(s) 28 may cause the user to turn around and notice that an unauthorized person has taken the laptop. The smart phone and/or the smart watch may also provide real time geo-positioning or directional tracking information to facilitate the timely determination of the location of the laptop. The user may then contact the authorities and/or approach the unauthorized person to recover the laptop.

Events that can cause one or more of the electronic devices 32-34 to violate a threshold condition are not limited to an unauthorized person taking one of the electronic devices 32-34. Other examples may include the smart phone falling out of the user's pocket without the user noticing. The monitoring module 14 may determine the smart phone has fallen out of the pocket based on detecting an acceleration profile that matches that of a dropped phone, i.e., a short drop followed by a rapid deceleration resulting from the impact with the ground. In response to determining the smart phone has fallen out of the pocket, the monitoring module 14 may generate a notification signal 26 that triggers the smart watch to generate an alert signal 28 so the user notices the loss of the smart phone.

As another example, the user may remove the smart watch while typing on the laptop, and later forget to put the smart watch back on their wrist. The smart watch may then generate a notification signal and trigger the smart phone and/or the laptop to generate alert signals in response to violation of a threshold condition. In this case, an exemplary threshold condition may be that the watch is beyond an allowable distance from the smart phone for a predetermined time after the user has stopped typing on the laptop. In response to one or more of the alert signals, the user may notice that the smart watch on not on their wrist.

Each of the electronic devices 32-34 may alert the other electronic devices when any of them are moved beyond some preset proximal range, position, or orientation with respect to one or more of the other electronic devices 32-34, and/or violate some other threshold condition. The electronic devices 32-34 may include hardware, firmware, software, or any combination thereof that enables the electronic devices 32-34 to communicate and/or alert even when they are placed in a hibernation, sleep, powered down, or other low-power mode. In cases where the electronic devices 32-34 have been operating without a communication link to the server 20, the devices 32-34 may store tracking, environmental, and/or other data locally, and automatically transmit the stored data upon reconnecting to the network 22.

Figure 3:
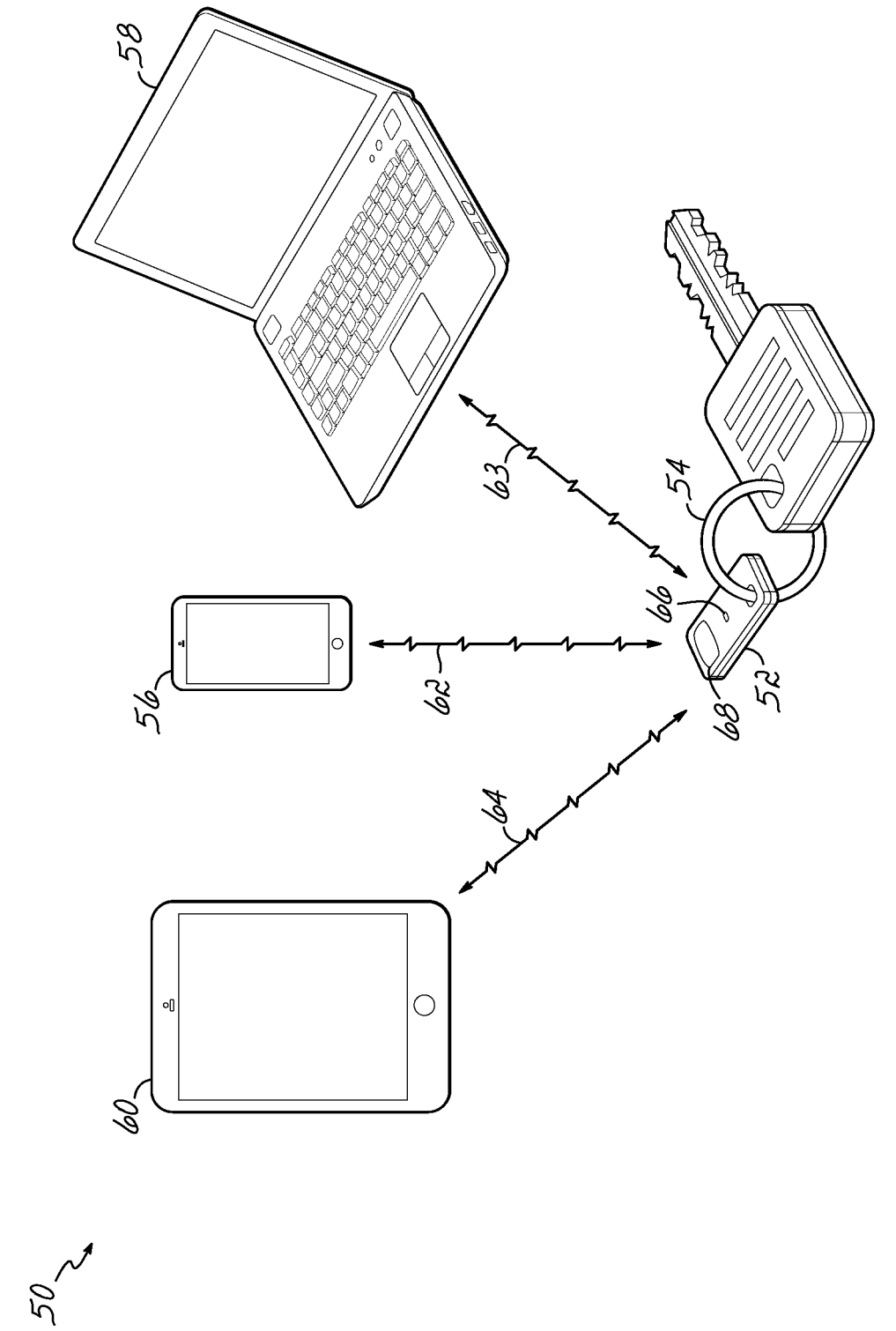
FIG. 3 is a diagrammatic view of a security system including a plurality of electronic devices that are linked to a monitoring device by virtual tethers.

FIG. 3 illustrates an exemplary security system 50 in accordance with another embodiment of the invention. The security system 50 includes an electronic device 52, which may be attached to a key ring 54 or carried in a pocket, a smart phone 56, a laptop computer 58, and a tablet computer 60. Although the electronic device 52 is depicted as a fob, the electronic device 52 may have any number of form factors, such as a watch (e.g., a Fitbit®, which is an electronic device available from the Fitbit company of San Francisco, California), an earpiece, or any other device which can be worn or kept about the person.

The electronic device 52 may be configured to provide a monitoring device or "pocket watch dog" that monitors the position and/or proximity of the electronic devices of the user, such as the depicted smart phone 56, laptop computer 58, and tablet computer 60. The electronic device 52 may monitor the position and/or proximity of other electronic devices using Bluetooth, Wi-Fi, RFID, NFC, or any other suitable wireless communication protocol. The electronic devices monitored by the electronic device 52 may include any electronic device that can detect its position (absolute or relative to the electronic device 52), and communicate that position to the electronic device 52. The electronic device 52 may include running instances of the monitoring and/or alert modules 14, 18 to provide a dedicated electronic device for monitoring the user's other devices. Each of the devices being monitored may also include running instances of the monitoring and/or alert modules 14, 18, and may transmit tracking data to and/or receive tracking data from the electronic device 52. The electronic device 52 may thereby provide a virtual tether 62-64 to each electronic device of the security system 50.

Each electronic device 52, 56, 58, 60 may be in communication with one or more of the other electronic devices 52, 56, 58, 60 and/or the server 20. The electronic device 52 may act as a local communication node for the other electronic devices 56, 58, 60, thereby functioning as a common point to which each of the other electronic devices 56, 58, 60 are virtually tethered. The electronic device 52 may also provide an interface to the user that allows the user to select from one or more predetermined security modes or modes of operation. For example, a travel or airplane mode might be programmed into the electronic device 52 to enable the user to temporally deactivate the tethering feature for an electronic device stored in the user's luggage or purposefully left behind in a secure area.

Another preprogramed mode of operation may include a stay mode wherein the user specifies that a specific electronic device 56, 58, 60 is required to remain stationary (e.g., in a hotel room) even though the user may move, perhaps significantly, away from the position of the electronic device 56, 58, 60. The stay mode may be used, for example, by a user presenting at a meeting, conference, or tradeshow who wants to specify that a particular laptop computer being used in a presentation remain in its designated position on display or within a tradeshow booth.

In another exemplary embodiment of the invention, the positions of the electronic devices 56, 58, 60 may be monitored by a third party. For example, a security service or company may act as a virtual "watch dog" and alert the user (e.g., vie a text message) and/or the authorities if suspicious activity occurs. In this embodiment, the user might pay a security company a monthly fee for the monitoring their mobile personal property. It should also be appreciated that to reduce costs and/or power consumption, the monitoring module 14 may select the most efficient communication protocol available for monitoring and reporting its position with sufficient accuracy.

By way of example, once a device's absolute position is determined using GPS, the monitoring module 14 may update its position using an internal accelerometer to monitor motion of the device. Each monitoring module 14 may also dynamically alternate between various wireless communications protocols such Bluetooth, BLE, Wi-Fi, RFID, NFC, cellular, and/or satellite telecommunication services to track and communicate its position. In yet another embodiment of the invention, an electronic device with a battery having a relatively full charge or that is plugged into a charger may determine its position using a power intensive protocol (e.g., GPS), and provide this position data to other nearby electronic devices using a lower power protocol (e.g., BLE). The security system 50 may rotate which electronic device 52, 56, 58, 60 uses the power-intensive protocol based on the status of the devices' respective power supply.

As described above, the decision process for determining whether to generate a notification signal may take into consideration the relative proximity of the electronic device 56, 58, 60 to each other and/or to the electronic device 52. The decision process may also consider patterns of behavior and/or geographical data. To this end, one or more of the electronic devices 52, 56, 58, 60, either independently or in cooperation with the server 20, may define certain locations, such as the user's home or place of business, as "safe zones". When the electronic devices 52, 56, 58, 60 are in a safe zone, the allowable distances and/or positions of the electronic devices 52, 56, 58, 60 may be altered to account for the fact that in such a safe zone, the positions of electronic devices 52, 56, 58, 60 relative to each other may not be correlated with a significant security risk.

Likewise, in an office or place of business, the electronic devices 52, 56, 58, 60 may be programmed such that no alerts will be generated if, for example, the laptop computer 58 remains in the user's office while the electronic device 52, smart phone 56, and/or tablet computer 60 travels to another location. If the office is identified as a safe zone, the threshold conditions may not be violated by the laptop computer 58 being left behind, and the server 20, electronic device 52, or other electronic devices 56, 60 may not generate any notification or alert signals. The user may also designate specific devices as exceptions to the safe zone. For example, a user may want to have their smart phone with them at all times, in which case they would want to receive an alert signal 28 from their smart watch if the smart phone was left at home despite the fact that home was designated as a safe zone. The designation as a safe zone could also be time dependent. For example, leaving a laptop of tablet computer at the office during business hours (e.g., while going to lunch) might not trigger an alert signal 28, but leaving the laptop or tablet computer at the office at the end of the day (e.g., after 5:00 pm) might trigger an alert signal 28.

Similarly, the security system 50 may vary the alerting status depending on other behavior factors and patterns including, the location, environment, time of day, or any other variables. To this end, the server 20 and/or electronic devices 52, 56, 58, 60 may record position data in the database 24 and determine patterns of behavior against which to evaluate potential suspicious activity. If certain activity did not correspond to an expected routine, the security system 50 may trigger an alert signal 28. By tracking patterns of behavior, the security system 50 may be able to adjust threshold conditions to improve both the sensitivity and the accuracy of the security system 50 to detecting threats. The electronic device 52 could thereby provide a high level of protection for the electronic devices 56, 58, 60 while simultaneously avoiding false alert signals 28.

The electronic device 52 may include a user interface comprising an output device 66 (e.g., an audio transducer and/or light emitting diode) for transmitting the alert signal 28 and/or otherwise providing feedback to the user, and an input device 68 (e.g., one or more buttons) for receiving user input. For example, the electronic device 52 may receive input from a user in response to the user activating a button, deliberately shaking the electronic device 52, or by issuing voice commands. The electronic device 52 may provide feedback to a user by illuminating a light emitting diode in various shades of colors and intensities, as well as by vibrating and/or emitting a sound or some combination of sounds or tones.

Figure 4:
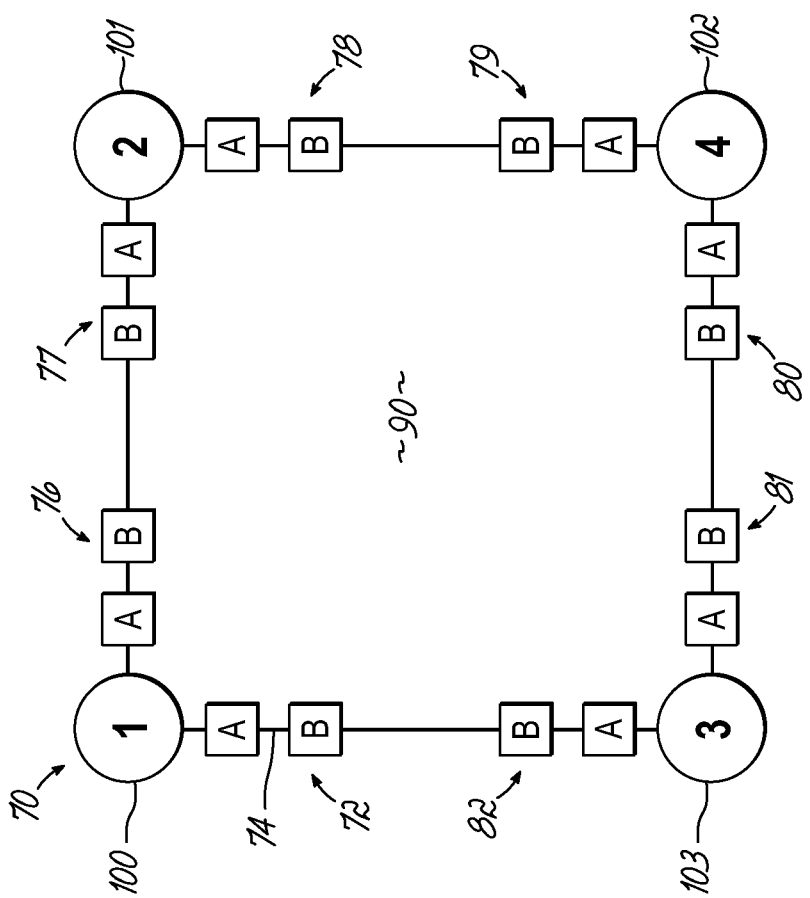
FIGS. 4-6 are diagrammatic views of safe zones defined by identifying a plurality of boundary points or a perimeter using one of the electronic devices of FIGS. 1-3.
Figure 6:
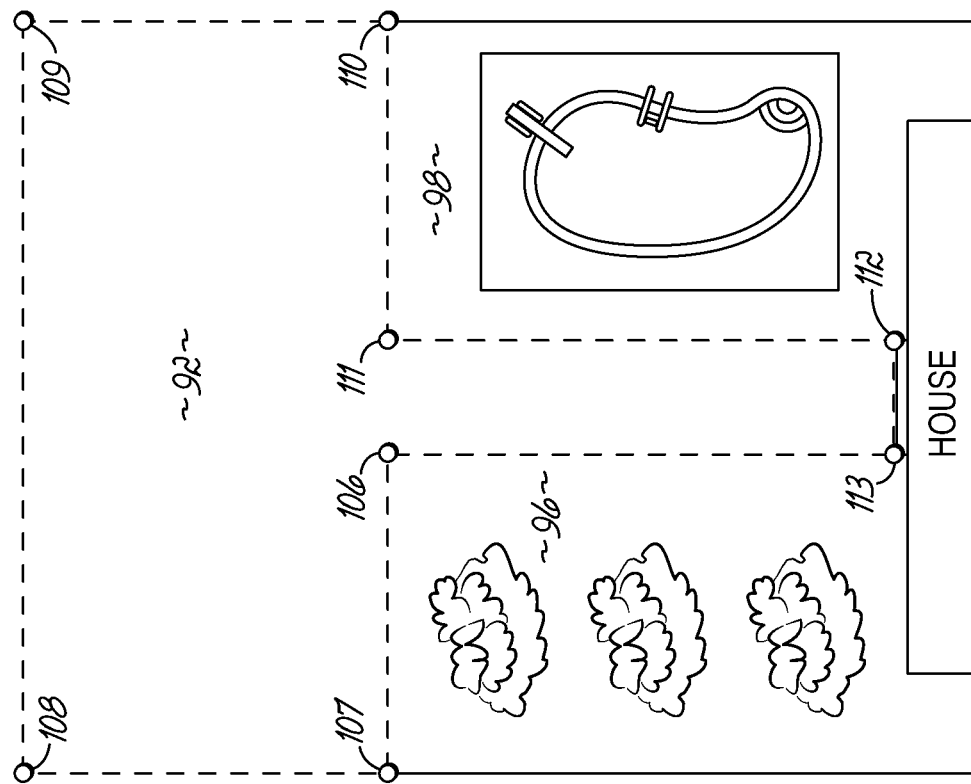
Figure 5:
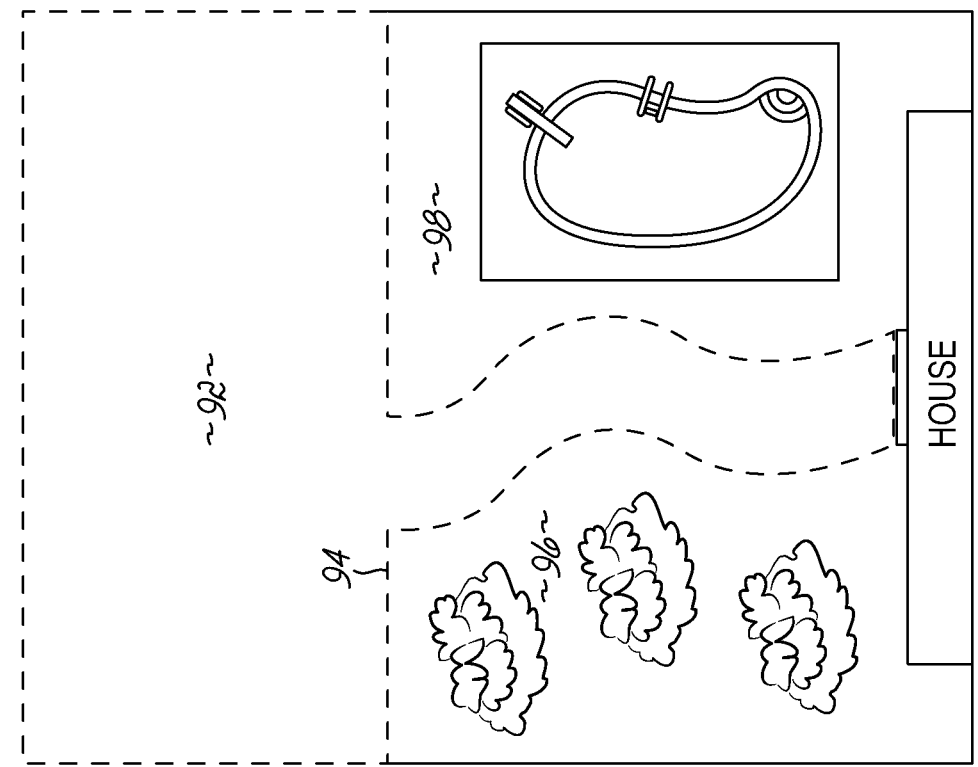

Referring now to FIGS. 4-6, the electronic device 52 may be further configured to enable users to define virtual boundaries, safe zones, and/or tethers. For example, upon entering a room 70, the user may mark an opening 72, such as doorway, by activating the input device 68 in a predetermined manner while standing in proximity to the opening, e.g., by pressing a button one or more times. In response to the user activating the input device 68, the output device 66 may provide an indication (e.g., by flashing a red light) to indicate that a virtual boundary 74 has been defined. The electronic device 52 may then define or modify a threshold condition so that an alert signals 28 are only be generated if one the electronic devices 56, 58, 60 crosses the virtual boundary. Thus, a teacher in a classroom may freely move about without any concern that their electronic devices 56, 58, 60 might be taken out of the classroom. If a device 56, 58, 60 crosses the virtual boundary 74 without deactivating the virtual boundary 74 (e.g., by turning off the virtual boundary 74, either permanently or for a predetermined period of time) an alert signal 28 may be generated. The marking of boundaries depicted by FIG. 4 could also represent the perimeter of a building, a business office, a safe zone, or any other area to which the user wants to confine the electronic devices 56, 58, 60.

The electronic device 52 may also be used to define a geographical area. For example, if the room in the above example has multiple openings 76-82, which could include doorways, windows, or other openings as determined by the user, the user may define a virtual boundary by activating the input device 68 and walking the perimeter of the room. The electronic device 52 would then define safe zone 90 wherein as long at the electronic devices 56, 58, 60 remained within the virtual boundary, alert signals 28 would not be generated. Another exemplary safe zone 92 is depicted in FIG. 5. Safe zone 92 may be defined by walking along a perimeter 94 that excludes certain restricted areas 96, 98, such as a flower bed or a pool, from which the user would like to exclude a child or pet.

A user could also define the safe zone 90, 92 by providing three or more sets of coordinates that define an enclosed area. For large areas or areas that include certain geographic or physical barriers, it may not be practical to click, hold, and walk around the perimeter of an area to define a safe zone. In such circumstances, a user could provide a unique input via the input device 68 to indicate that a virtual boundary was about to be drawn. For example, a user might activate the input device 68 in a predetermined manner (e.g., three times and hold) until the output device 66 provides an indication that a boundary point 100, 106 has been entered. Thereafter, activating the input device 68 in another predetermined manner (e.g., three times) may define a new boundary point 101, 102, 107-112. Once the last boundary point 103, 113 is entered, the user may activate the input device 68 in another predetermined manner e.g., by holding the input device 68 after the third activation. The output device 66 may then indicate that the virtual boundary had been established.

In an alternative embodiment of the invention, the user could pull up a map of the area in which they wished to create a safe zone on an electronic device having a suitable display, and add boundary points 100-103, 106-113 to the map by interacting with the user interface of the device. The safe zone may also be defined using an application that generates a geo-positional marker. The application may run on any suitable device of the user (e.g., one or more of devices 56, 58, 60) to define, name, and save the geo-fence boundaries for a safe zone. The user could then selectively activate/deactivate the safe zone at will.

Another virtual boundary feature may enable users to define permanent or temporary virtual boundaries having a fixed radius. The fixed radius may be around one or more of their electronic devices 52, 56, 58, 60, or around a selected geographic location or other fixed position. This feature may also allow the user to select another dimensional shape at a desired location, such as a rectangle, square, pie, etc., by closing off selected geo-positional locations of the area. For example, a parent could define a virtual boundary that defines a safe zone where a child could play while at home or away. The user may overwrite a previously defined virtual boundary, or add another virtual boundary that can be named and selected. Virtual boundaries may thereby be reused without the user having to redefine the same virtual boundary teach time they visit the same location.

Embodiments of the invention may allow the user to define a virtual boundary by providing input to the user interface of the electronic device being used to define the virtual boundary while they are standing at various points along the virtual boundary. The security system may close the boundary areas in a manner like a real property survey (e.g., using minutes and seconds). Embodiments of the invention may allow the user to name of each virtual boundary and selectively activate the virtual boundary. Exemplary virtual boundaries may be named "home", "work", "Aunt Sue", etc.

Virtual boundaries defined as a fixed radius around an electronic device may move with the device, so that a safe zone defined for a child, pet, or item tethered to the user will move with the user. This may allow, for example, the user to walk their dog without a leash. To this end, an electronic device may be coupled to the pet, e.g., attached to a collar worn by the pet. The alert signal 28 could be configured to provide the pet with a graduated warning, punishment, etc., as the pet approaches and/or exceeds the virtual boundary. This embodiment may thereby eliminate the need for a physical boundary using buried wires or fencing materials. In response to the pet violating a threshold condition (e.g., by crossing the virtual boundary), an appropriate alert signal 28 could be transmitted to a responder (e.g., the pet owner) in addition to the graduated warning provided to the pet.

Figure 7:
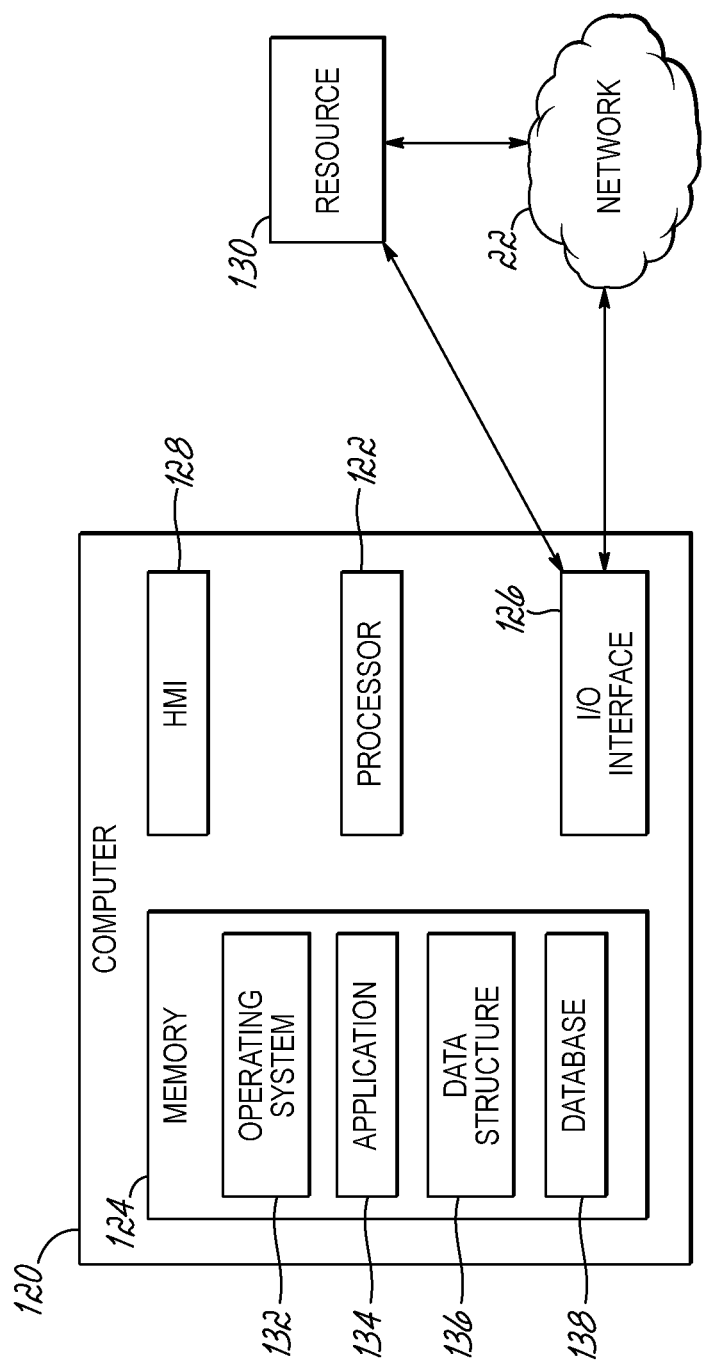
FIG. 7 is a diagrammatic view of an exemplary computer that may be used to provide the devices of FIGS. 1-3.

Referring now to FIG. 7, the electronic devices 12, 16, 32-34, server 20, network 22, and database 24 may be implemented using one or more computing devices, modules, or systems, such as exemplary computer 120. The computer 120 may include a processor 122, a memory 124, an input/output (I/O) interface 126, and a Human Machine Interface (HMI) 128. The computer 120 may also be operatively coupled to one or more external resources 130 via the network 22 or I/O interface 126. External resources may include, but are not limited to, servers, databases, mass storage devices, peripheral devices, cloud-based network services, or any other resource that may be used by the computer 120.

The processor 122 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in memory 124. Memory 124 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, and/or data storage devices such as a hard drive, optical drive, tape drive, volatile or non-volatile solid state device, or any other device capable of storing data.

The processor 122 may operate under the control of an operating system 132 that resides in memory 124. The operating system 132 may manage computer resources so that computer program code embodied as one or more computer software applications, such as an application 134 residing in memory 124, may have instructions executed by the processor 122. The processor 122 may also execute the application 134 directly, in which case the operating system 132 may be omitted. The one or more computer software applications may include a running instance of an application comprising a server, which may accept requests from, and provide replies to, one or more corresponding client applications. One or more data structures 136 may also reside in memory 124, and may be used by the processor 122, operating system 132, and/or application 134 to store or manipulate data.

The I/O interface 126 may provide a machine interface that operatively couples the processor 122 to other devices and systems, such as the network 22 or external resource 130. The application 134 may thereby work cooperatively with the network 22 or external resource 130 by communicating via the I/O interface 126 to provide the various features, functions, applications, processes, and/or modules comprising embodiments of the invention. The application 134 may also have program code that is executed by one or more external resources 130, or otherwise rely on functions or signals provided by other system or network components external to the computer 120. Indeed, given the nearly endless hardware and software configurations possible, it should be understood that embodiments of the invention may include applications that are located externally to the computer 120, distributed among multiple computers or other external resources 130, or provided by computing resources (hardware and software) that are provided as a service over the network 22, such as a cloud computing service.

The HMI 128 may be operatively coupled to the processor 122 of computer 120 to enable a user to interact directly with the computer 120. The HMI 128 may include video or alphanumeric displays, a touch screen, a speaker, and any other suitable audio and visual indicators capable of providing data to the user. The HMI 128 may also include input devices and controls such as an alphanumeric keyboard, touch screen, a pointing device, keypads, pushbuttons, control knobs, microphones, etc., capable of accepting commands or input from the user and transmitting the entered input to the processor 122.

A database 138 may reside in memory 124, and may be used to collect and organize data used by the various devices, systems, and modules described herein. The database 138 may include data and supporting data structures that store and organize the data. The database 138 may be arranged with any database organization or structure including, but not limited to, a relational database, a hierarchical database, a network database, an object-oriented database, or combinations thereof.

A database management system in the form of a computer software application executing as instructions on the processor 122 may be used to access data stored in records of the database 138 in response to a query, where the query may be dynamically determined and executed by the operating system 132, other applications 134, or one or more modules. Although embodiments of the invention may be described herein using relational, hierarchical, network, object-oriented, or other database terminology in specific instances, it should be understood that embodiments of the invention may use any suitable database management model, and are not limited to any particular type of database.

Figure 8:
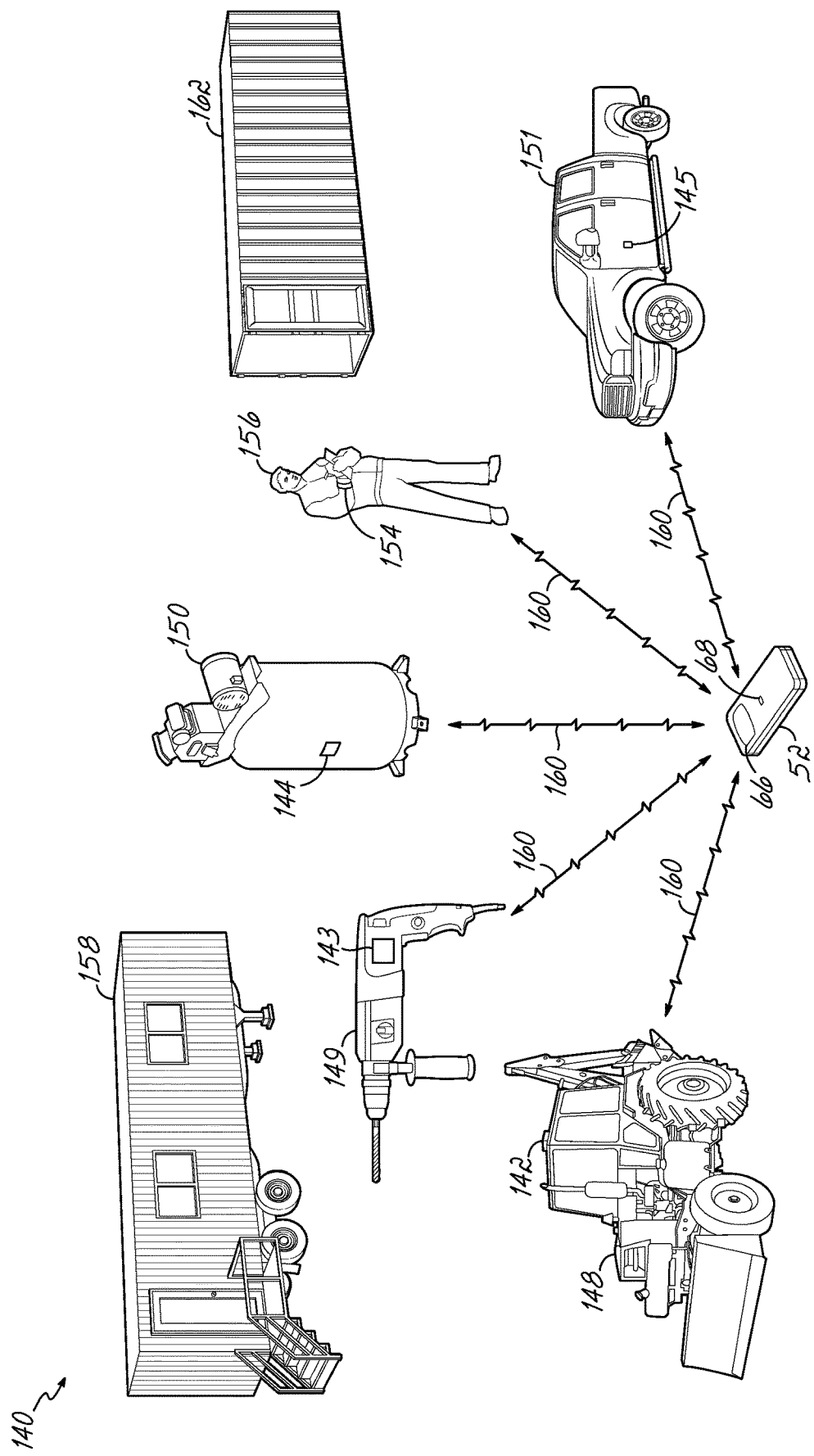
FIGS. 8 and 9 are diagrammatic views of exemplary operating environments for the electronic devices of FIG. 3.

FIG. 8 illustrates an exemplary operating environment 140 for a security system in accordance with an embodiment of the invention. Operating environment 140 may relate to an industrial or construction environment in which at least some of the assets to be secured do not include their own internal computing and/or communication capabilities. To address this issue, an electronic device in the form of a control tag 142-145 may be attached to each asset 148-151 to be secured. Each control tag 142-145 may include computing and communication capabilities sufficient to support at least one of the monitoring and/or alert modules 14, 16, and may be configured to communicate to one another, the server 20, and/or to the electronic device 52, either directly or through the network 22, using one or more wireless communications protocols. That is, the control tags 142-145 may operate in a similar manner as the electronic devices 12, 16, 56, 58, 60 described above. Each control tag 142-145 may be linked to one or more of the other control tags 142-145 and/or one or more electronic devices 52 by a virtual tether.

The control tags 142-145 may include an internal power source, such as a battery or other power storage device. The control tags 142-145 may also receive power from an external source, such as a solar cell, a motion generator, and/or from the assets 148-151 to which they are attached. External power may be provided to the control tags 142-145 using a direct electrical connection or indirectly, e.g., via induction. The control tags 142-145 may be attached to their respective assets 148-151 by any suitable fasteners such as screws, bolts, nails, adhesives, glues or the like. The control tags 142-145 may also be attached internally to or be integral with the assets 148-151.

In some cases, an asset 148-151 may include sufficient computing and communication resources to support the monitoring and/or alert module 14, 16. For example, some assets may be Internet of Things ("IoT") enabled assets. These assets may be configured to connect to and communicate over the Internet, and in some cases, may be configured to operate as a control tag by installing an application that provides the monitoring and/or alert module 14.

In addition to control tags 142-145 being associated with the assets 148-151, a personnel locator tag 154 may be worn or otherwise carried by one or more workers 156 to allow persons in a command center 158 (e.g., a construction supervisor's trailer or the like) to track the relative position of the workers 156. The personnel locator tag 154 may be worn on or be integral with hardhats, work vests, radios, and/or installed as an application on a phone of the worker 156 to minimize any potential inconvenience. There may be a virtual tether 160 between the personnel locator tag 154 (and thus the worker 156) and the electronic device 52. In one scenario, a single supervisor might carry the electronic device 52. In another scenario, the electronic device 52 might relay its information to the server 20. A supervisor could then monitor the assets 142-145 and/or worker 156 by logging into the server 20 using a computing device in the command center 158. This may enable a construction site supervisor to better manage the job site. For example, if the construction manager needed someone to take an asset 149

(e.g., a hammer drill) from an equipment shed 162 to a location on the job site, the construction manager could see which worker was closest to the equipment shed 162 at that time and task that worker to retrieve the asset.

Embodiments of the invention may also be used for inventory control. For example, the command center 158 and/or a supervisor carrying the electronic device 52 may be notified when unusual use of an asset 148-151 is detected. Unusual use may include movement of the asset after construction hours, movement to areas that are not on the construction site or route, and/or movement to areas that are restricted, such as pawn shops. Worker movement could also be monitored to detect potential foul play and/or to increase productivity. Safe zones or routes may also be defined so that alert signals 28 are not generated if the assets 148-151 remain within a specified construction site or route. In other cases, movement of an asset outside of the safe zone (e.g., the construction site) without a previously given reason may trigger generation of an alert signal 28 due to the risk that the asset is being misappropriated. Having real time knowledge of the location of both equipment and personnel and their relative positions to one another may also enable a supervisor and/or an automated computer processor to more advantageously allocate and manage resources, save time, and thereby increase efficiency and productivity.

Figure 9:
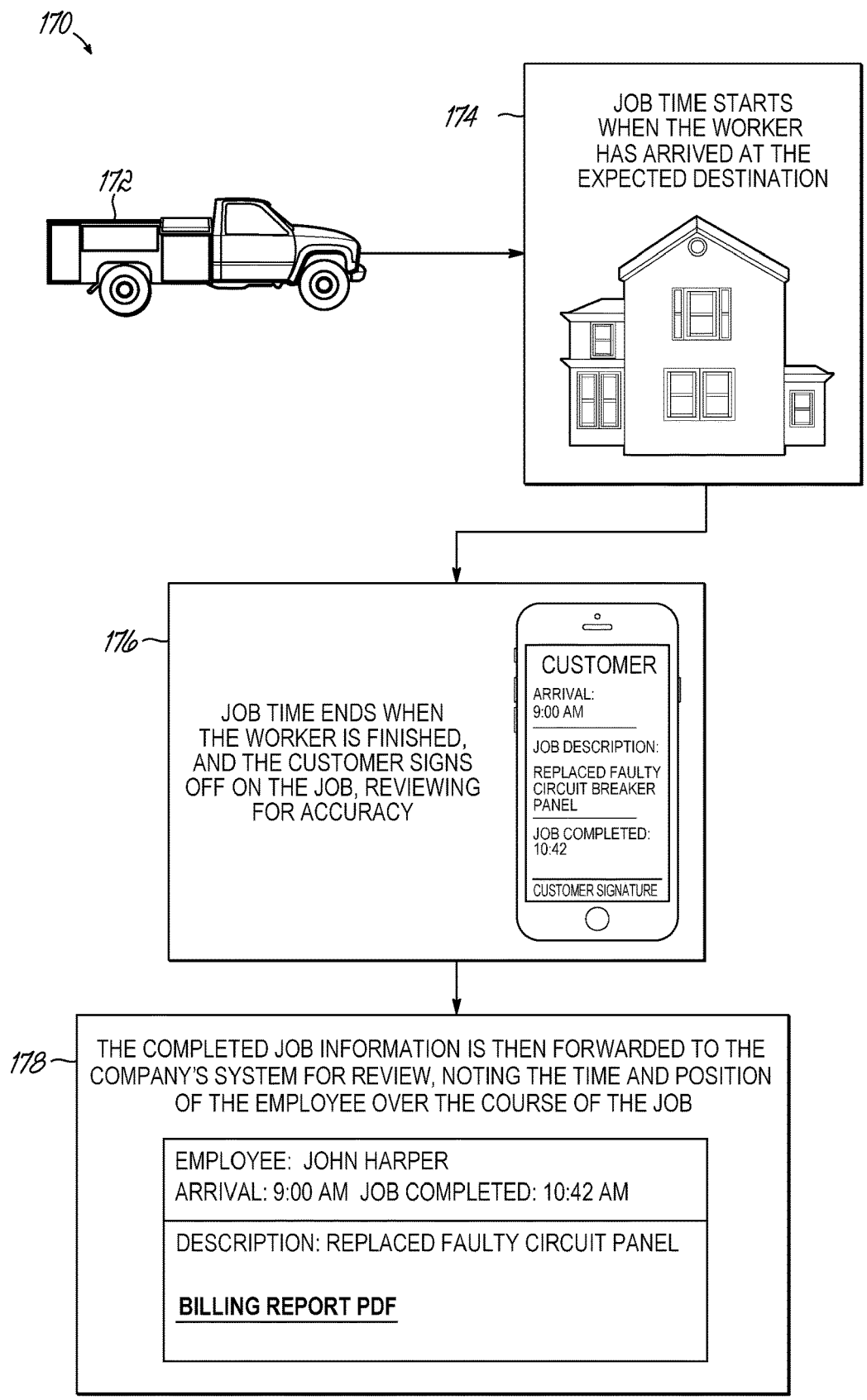

FIG. 9 illustrates an exemplary operating environment 170 in accordance with an embodiment of the invention where the security system is used to track time on a job. In this example, the geographic location of a work vehicle 172 may be tracked to a job site 174. The server 20 may receive time stamped tracking data from a monitoring module 14 residing on an electronic device carried by the worker or mounted to the vehicle 172. The tracking data may be stored in the database 24 and compared to the geographic location of the job site to determine when the worker arrived on site. When the job has been completed, the customer may sign off on an electronic document 176 displayed by an electronic device indicating that the job has been completed satisfactorily. The completed job information may be forwarded to the company's back-end system 178. The company's back-end system 178 may retrieve time stamp information indicating the arrival time from the server 20, and compare time stamps on the billing logs to the time stamps on the position logs for the truck to identify how long the job took to complete.

Figure 10:
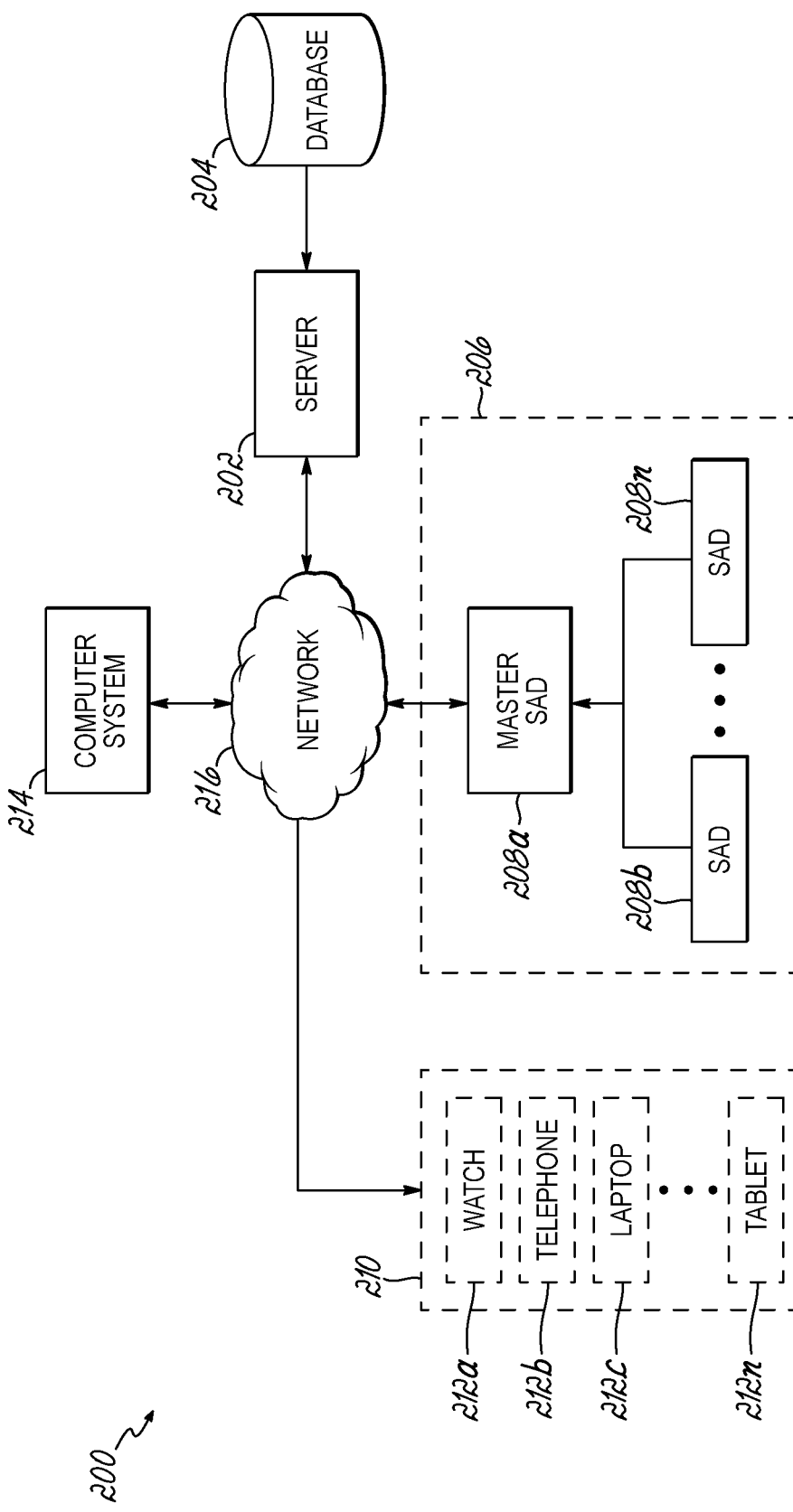
FIG. 10 is a diagrammatic view of a security system including the electronic devices, server, and database of FIGS. 1-3 and a plurality of stand-alone devices.

FIG. 10 illustrates an exemplary security system 200 in accordance with an embodiment of the invention that includes a server 202 (e.g., a cloud based server), a database 204 (e.g., a cloud based database), a group 206 of stand-alone devices (SADs) 208a-208n including a master stand-alone device 208a that may be in communication with the other stand-alone devices 208b-208n, a group 210 of electronic devices 212a-212n which may be in communication with each other, and a third-party computer system 214. Each of the server 202, stand-alone devices 208a-208n, electronic devices 212a-212n, and third party computer system 214 may be in communication over a network 216. The network 216 may include one or more private or public data networks (e.g., the Internet, a cellular data network, and/or wireless wide-area network (WAN), etc.) that enable the exchange of data between systems connected to the network 216. The server 202 may be in communication with the database 204 to store and manage data received from monitoring and/or alert modules on the devices 208a-208n, 212a-212n. Data received from the monitoring modules 14 and/or alert modules 18 may include position data, movement data, environmental data, device status data, and/or any other suitable data.

The server 202 and/or one or more of the stand-alone devices 208a-208n may function as a system that detects when one or more of the electronic devices 212a-212n is in violation of a threshold condition. For example, in response to determining it has caused a threshold condition to be violated, the offending electronic device 212a-212n may transmit a notification signal 26 to one or more of the server 202 and/or stand-alone devices 208a-208n indicating the violation has occurred. In an alternative embodiment of the invention, the server 202 may determine the violation has occurred based on data received from the electronic devices 212a-212n, and transmit the notification signal 26 to one or more of the stand-alone devices 208a-208n and/or electronic devices 212a-212n. In either case, in response to receiving the notification signal 26, the recipient device(s) may generate an alert signal 28 that indicates the offending electronic device 212a-212n is in violation of the threshold condition, e.g., that the electronic device 212a-212n in question has moved outside of an allowed area. To support this alerting function, each of the stand-alone devices 208a-208n and/or the electronic devices 212a-212n may include a running instance of the alert module 18.

The master stand-alone device 208a may be configured to determine its geographic location using a radio-navigation system (e.g., GPS) and transmit its geographic location to the other stand-alone devices 208b-208n and/or the server 202. The master stand-alone device 208a may also include a suitable communication capability (e.g., LTE) that enables the master stand-alone device 208a to communicate with the server 202 from a remote location. The master stand-alone device 208a may include encryption for security, and memory to record its geographic location and/or data received from the other stand-alone devices 208b-208n. Data may be stored in memory by the master stand-alone device 208a for later transmission to the server 202 during periods of time when the master stand-alone device 208a is unable to transmit data, e.g., due to a network failure or a weak network signal.

The other stand-alone devices 208b-208n in the group 206 may determine their position directly using the radio-navigation system, or may determine their positions relative to the master stand-alone device 208a by using a lower power signal, such as BLE. Similarly, the other stand-alone devices 208b-208n in the group 206 may communicate with the server 202 through the master stand-alone device 208a. To this end, the other stand-alone devices 208b-208n in the group 206 may transmit data to, and receive data from, the master stand-alone device 208a using the low-power signal. The master stand-alone device 208a may in turn relay the data to and from the server 202 using a higher-power signal, e.g., LTE. The master stand-alone device 208a may thereby function as both a geographic marker and a network access point that allows the other stand-alone devices 208a-208n to operate with reduced power consumption.

The server 202 may capture tracking and other data from the stand-alone devices 208a-208n, store the data (e.g., in the database 24), analyze the data, and generate analytic results based thereon. The analysis of the data may be performed using one or more algorithms defined by a security company, a system user, and/or that are developed using automated methods such as artificial intelligence. The system user may be required to have a subscription to access the analytic results generated by the server 202. The analytic results may be received from the server 202 over an interface selected by the system user, and/or via one or more of the electronic devices 212a-212n.

The system user may associate the master stand-alone device 208a with a selected number of the other stand-alone devices 208a-208n and/or electronic devices 212a-212n to define a group of devices. The system user may then authorize an employer or other third party to access analytic results generated based on data from the defined group of devices. The defined group of devices may be associated with a specific person, location, and/or project for the purpose of using, controlling, securing, and/or monitoring one or more assets (e.g., person or item) to which the selected stand-alone devices 208a-208n have been attached. The system user or an authorized third party may elect to receive the analytic results generated by the server 202 via a suitable computing device, such as the third-party computer system 214.

Each stand-alone device 208a-208n may include a running instance of one or more of the monitoring and/or alert modules 14, 16, and may be assigned to a person or location to determine the position, orientation, and/or movement thereof. The system user or a third party may define threshold conditions for the one or more stand-alone devices 208a-208n based on their relation to each other, a geographic location, an electronic device 212a-212n, historical data relating to past behavior of one or more of the devices 208a-208n, 212a-212n, or any other parameter. The server 202 may monitor the data received from the stand-alone devices 208a-208n for compliance with the threshold conditions. In response to determining that one or more of the threshold conditions have been violated, the server 202 may cause an alert signal 28 to be generated by a device of the system user or third party to notify them of the violation.

The server 202 may determine the geographic location for one or more stand-alone devices 208a-208n and/or electronic devices 212a-212n, whether related or not, to provide the user with data relating to the device's travel path, velocity, acceleration, resting locations and the duration of the period of rest, distance traveled during a specified period of time, elevation, an amount of time within a specified distance of one or more other stand-alone device 208a-208n and/or electronic device 212a-212n, and/or any other tracking, environmental, and/or device status data. The continuous, adjusting positional relationship of a stand-alone or electronic device with another stand-alone or electronic device may allow for the fluid migration or movement of assets without any boundaries outside of those programmed by the system user.

The server 202 may allow the system user to customize the server interface for security, productivity, etc. The server 202 and/or one of the electronic devices 212a-212n may be used to generate a ticket for services, parts, and/or equipment performed or provide by the system user using the data collected from the stand-alone and/or electronic devices for billing a system user's client. The server 202 may be configured so that the system administrator can limit and/or terminate the system user's access to the analytic results or other data. The server 202 may store the analytic results and/or other data collected from the devices for an agreed upon period of time.

When a threshold condition has been violated, a notification signal 26 may be transmitted via electronic means, such as a text message, email, facsimile, prerecorded telephone message. The notification signal 26 may be transmitted to a device of a first responder and then to first and second alternative responders until the server 202 receives a reply indicating receipt of the notification signal 26. In response to receiving acknowledgment of the notification signal 26, the server 202 may be configured to send instructions to the responder. The server 202 may require the responder acknowledge completion of an initial instruction to complete a specific act or task, and for each successive instruction, until a full set of instructions has been sent by the server 202. Once the set of instructions has been completed, the server 202 may transmit an acknowledgement of completion to the responder. The server 202 may maintain a timestamped log in the database 204 documenting all relevant notification signals 26 transmitted. The log may include the identity of the stand-alone or electronic device transmitting the data that triggered the notification signal 26, the threshold condition(s) violated, the text of any notification signals 26 sent, the text of all replies received by the server, any instructions sent to a responder, an indication of whether the instructions were completed, and the identity of the responders receiving the notification signals 26 and/or completing the instructions.

Figure 11:
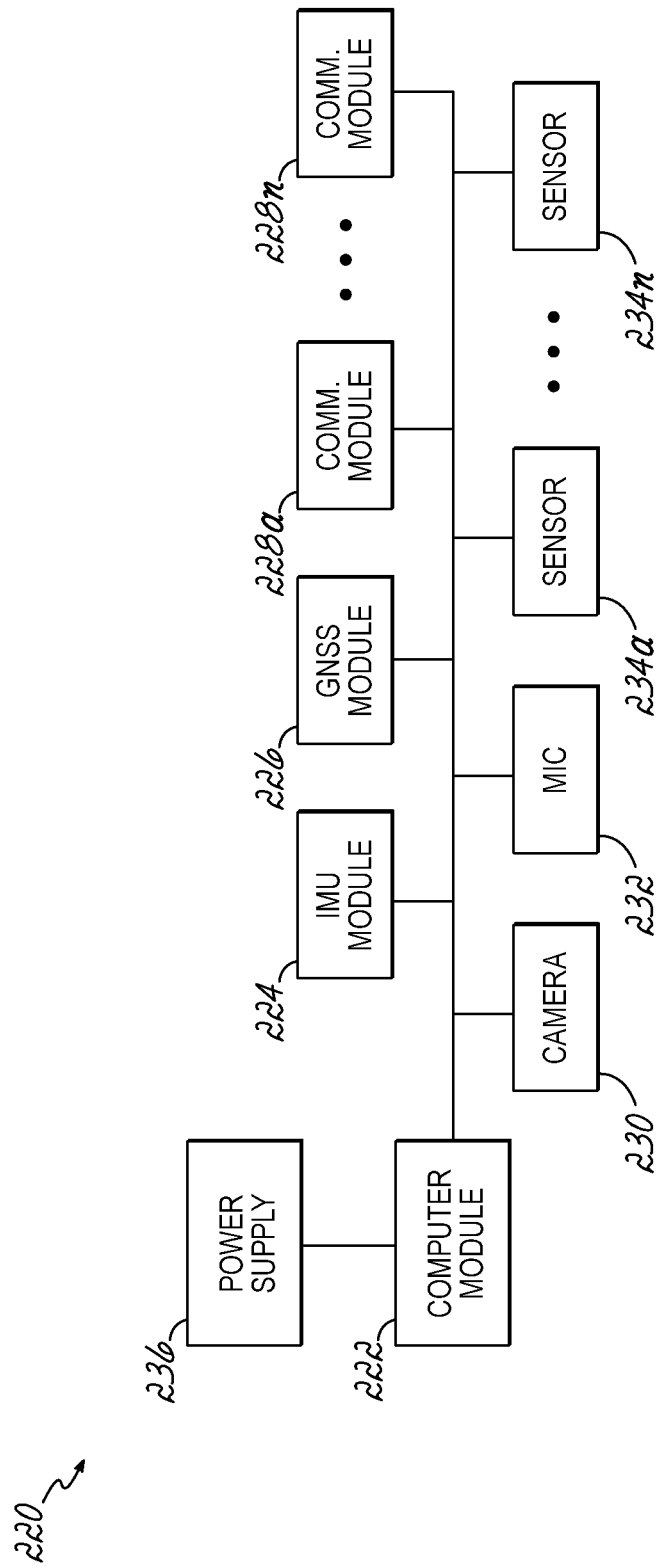
FIG. 11 is a diagrammatic view depicting additional details of an exemplary stand-alone device of FIG. 10.

FIG. 11 illustrates an exemplary stand-alone device 220 including a computing module 222 in communication with a plurality of other components. These components may include one or more of an Inertial Measurement Unit (IMU) module 224, a Global Navigation Satellite System (GNSS) module 226, one or more communication modules 228a-228n, a camera 230, a microphone (MIC) 232, one or more sensor modules 234a-234n, and a power supply 236. The IMU module 224 may be configured to measure acceleration (e.g., linear and/or angular) in a plurality of axes to determine changes in position, velocity, and orientation of the stand-alone device 220. The GNSS module 226 may be configured to receive signals from one or more satellites, such as those of the GPS system and, based on those signals, determine the geographic location of the stand-alone device 220. The computing module 222 may use signals received from the IMU and GNSS modules 224, 226 to determine the position, velocity, acceleration, and/or orientation of the stand-alone unit 220 relative to the Earth and/or another device. The computing module 222 may communicate with each of the modules via an independent connection and/or over a serial bus, such as an Inter-Integrated Circuit ($I^2C$) serial computer bus.

The communication modules 228a-228n may include modules that support a variety of communication protocols, such as one or more cellular network protocols (e.g., LTE), wireless local area network protocols (e.g., Wi-Fi), personal area network protocols (e.g., ZigBee, Bluetooth, BLE), long range wide-area network protocols (e.g., Lora), and/or short range protocols (e.g., NFC, RFID). The computing module 222 may selectively activate one or more of the communication modules 228a-228n at various times to transmit and/or receive data from other devices and/or network nodes, such as the server 202. Signals transmitted and/or received through one or more of the communication modules 228a-228n may also be used to determine the location of the stand-alone device 220 relative to another device.

The sensor modules 234a-234n may include sensors configured to determine one or more parameters indicative of the environmental conditions proximate to the stand-alone device 220. The camera 230 and microphone 232 may enable the stand-alone device 220 to capture sound and images of the environment proximate to the stand-alone device 220, and transmit these sounds and images to the server 202 and/or another device. The availability of audio, video, and environmental data may allow the security system 200 to develop sophisticated threshold conditions that reliably detect events, and may also help a responder interpret the meaning of events detected by the security system 200.

The power supply 236 may include one or more self-contained sources of power (e.g., a battery, photovoltaic cell, etc.) as well as a circuit for coupling the power supply 236 (either by a direct connection or inductively) to an external source of power, such as the electric system of a vehicle or the power grid. The power supply 236 may be configured to store power in the self-contained power source (e.g., by charging a battery) when the power supply 236 is coupled to the external source of power for use when the external source of power is unavailable. The power supply 236 may also be configured to enable the computing module 222 to selectively control which of the other components of the stand-alone device receive power from the power supply, e.g., using a load switch.

Figure 12:
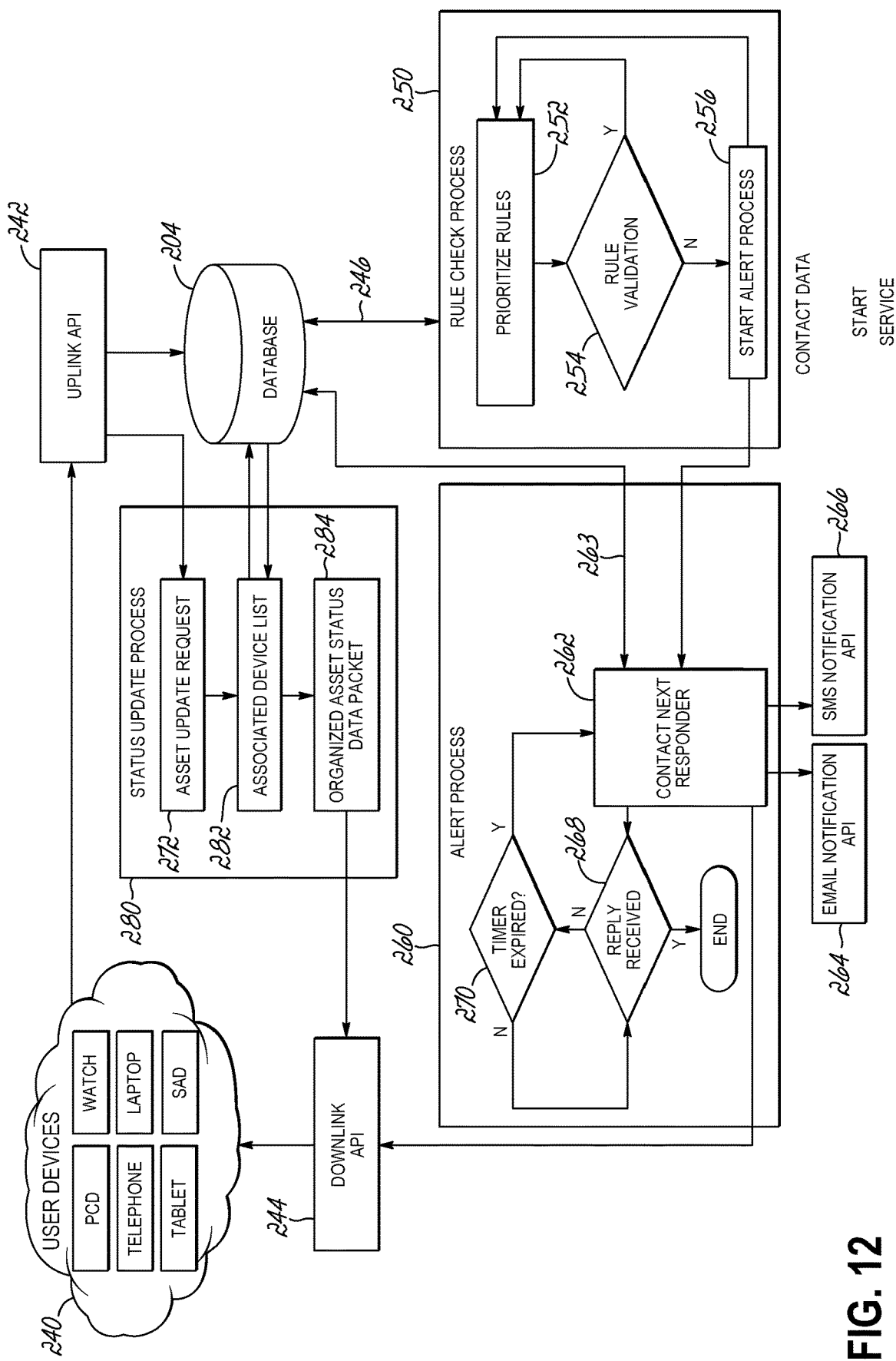
FIGS. 12-14 are flowcharts that illustrates sequences of operations that may be performed by the security system of FIG. 10.

FIG. 12 presents a logical diagram illustrating a flow of data between a plurality of devices 240, the database 204, and/or one or more processes that may be executed by the devices 240 and/or server 202 in accordance with an embodiment of the invention. The devices 240 may transmit data to the database 204 through an uplink Application Programing Interface (API) 242, and receive data from the database 204 from a downlink API 244. Each of the APIs 242, 244 may be a web-based API provided by the server 202. Data transmitted between the devices 240 and the database 204 may be transmitted using the Hypertext Transfer Protocol Secure (HTTPS) or any other suitable protocol, and may include authentication data, tracking data, environmental data, device status data, device identity lists, or any other suitable data.

A rule check process 250 may receive data 246 from the database 204 and analyze the data 246 to determine if a threshold condition has been violated. To this end, in block 252, the process 250 may prioritize one or more rules that define the threshold conditions for the device or devices being monitored. Prioritizing the rules may include determining an order in which to apply the rules to the data 246. The process 250 may proceed to block 254 and apply a selected rule to the data 246, where the rule is selected based on its priority as determined in block 252. If the result of applying the rule indicates a threshold condition is violated ("YES" branch of decision block 254), the process 250 may proceed to block 256, start an alert process 260, and return to block 252 to continue analyzing data for threshold condition violations. If the result of applying the rule does not indicate a threshold condition is violated ("NO" branch of decision block 254), the process 250 may return to block 252 and select the next rule to apply to the data 246.

In block 262, the alert process 260 may retrieve a list of responders 263 associated with the threshold constraints being analyzed from the database 204, select a responder from the list, send a notification signal 26 (e.g., using an email notification API 264, Short Message Service (SMS) notification API 266, or using API 244) to an electronic address associated with the responder, and proceed to block 268. In block 268, the process 260 may determine if a reply to the notification signal 26 has been received. If a reply has been received ("YES" branch of decision block 268), the process 260 may end. If a reply has not been received ("NO" branch of decision block 268), the process 260 may proceed to block 270.

In block 270, the process 260 may determine if a timer associated with the responder and/or the type of message used to send the notification signal has expired. If the timer has not expired ("NO" branch of decision block 270), the process 260 may return to block 268 and continue waiting for a reply. If the timer has expired ("YES" branch of decision block 270), the process 260 may proceed to block 262 and select another responder.

In response to receiving a request for a status update, the uplink API 242 may transmit the status update request 272 to a status update process 280. In response to receiving the status update request 272, the status update process 280 may proceed to block 282 and query the database 204 for data relating to a monitored asset, device, or group of devices identified by the status update request 272. The process 280 may then proceed to block 284 and organize the data into a status data packet, e.g., by applying the threshold conditions or other algorithms to the data to generate analytic results for inclusion in the data packet. The process 280 may transmit the data packet to the requesting device using the downlink API 244.

Figure 13:
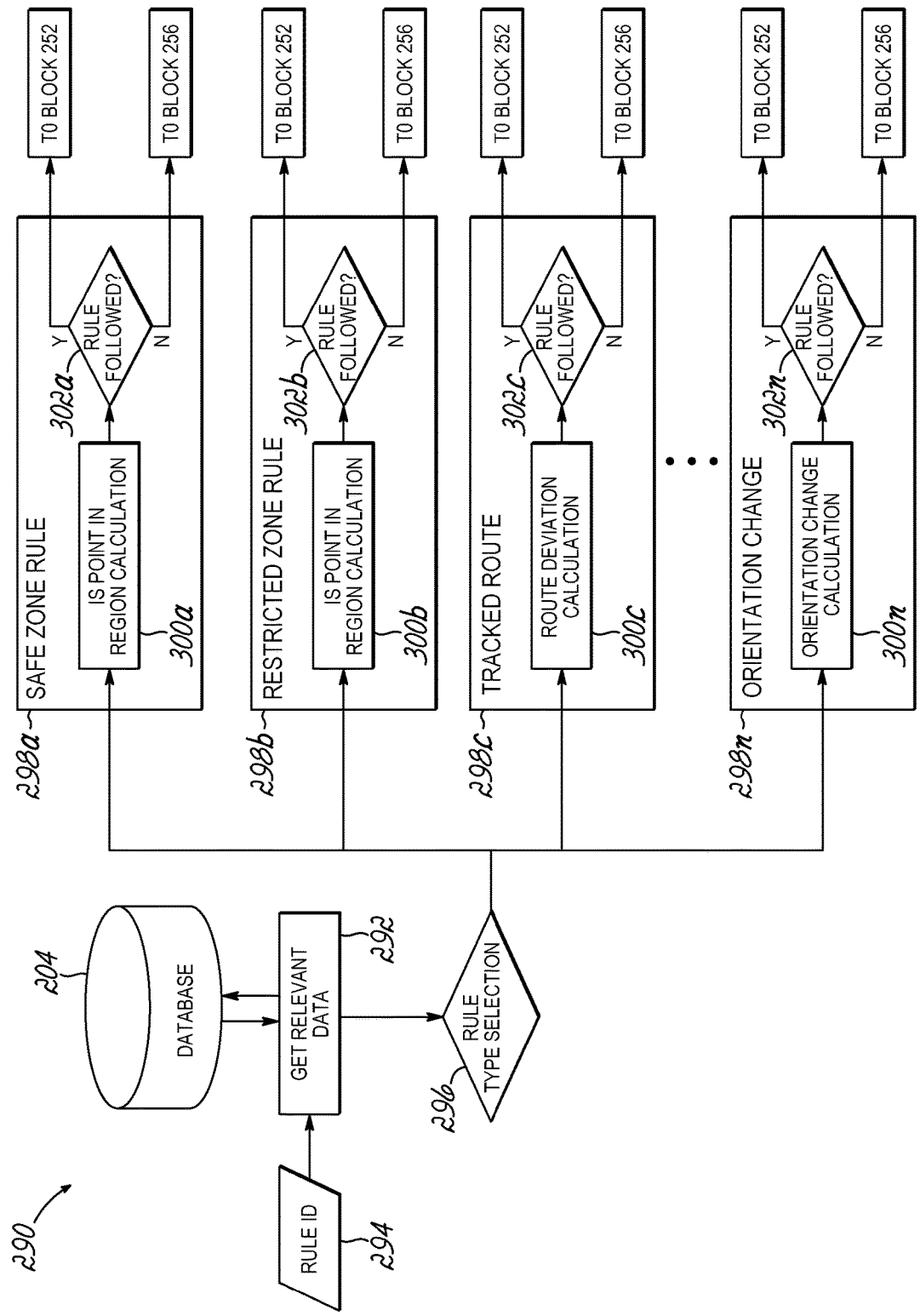

FIG. 13 depicts an exemplary process 290 that may be executed in block 254 of rule check process 250. In block 292, the process 290 may query the database 204 for data relating to a rule based on an identity of the rule 294. The process 290 may proceed to block 296 and determine the type of rule. Exemplary rules may include a safe zone rule 298a, a restricted zone rule 298b, a planned route rule 298c, an orientation change rule 298n, or any other rules that define a threshold condition. Based on the type of rule determined in block 296, the process 290 may proceed to a decision block 298a-298n corresponding to the rule.

In decision block 298a, the process 290 may perform a calculation 300a to determine if a monitored device is in a safe zone by applying the respective rule to the data returned by the database 204. If the monitored device is within the safe zone ("YES" branch of decision block 302a), the process 290 may proceed to block 252 of process 250. If the monitored device is not within the safe zone ("NO" branch of decision block 302a), the process 290 may proceed to block 256 of process 250.

In decision block 298b, the process 290 may perform a calculation 300b to determine if a monitored device is in a restricted zone by applying the respective rule to the data returned by the database 204. If the monitored device is not within the restricted zone, meaning the rule was followed ("YES" branch of decision block 302b), the process 290 may proceed to block 252 of process 250. If the monitored device is within the restricted zone, meaning the rule was not followed ("NO" branch of decision block 302b), the process 290 may proceed to block 256 of process 250.

In decision block 298c, the process 290 may perform a calculation 300c to determine if a monitored device is within an allowed distance of a planned route by applying the respective rule to the data returned by the database 204. If the monitored device is within the planned route ("YES" branch of decision block 302c), the process 290 may proceed to block 252 of process 250. If the monitored device is not within the safe zone ("NO" branch of decision block 302c), the process 290 may proceed to block 256 of process 250.

In decision block 298n, the process 290 may perform a calculation 300n to determine if a monitored device has experienced an orientation change that exceeds an allowable level by applying the respective rule to the data returned by the database 204. If the change in the orientation of the monitored device is within the allowable level ("YES" branch of decision block 302n), the process 290 may proceed to block 252 of process 250. If the change in the orientation of the monitored device is not within the allowable level ("NO" branch of decision block 302a), the process 290 may proceed to block 256 of process 250.

Figure 14:
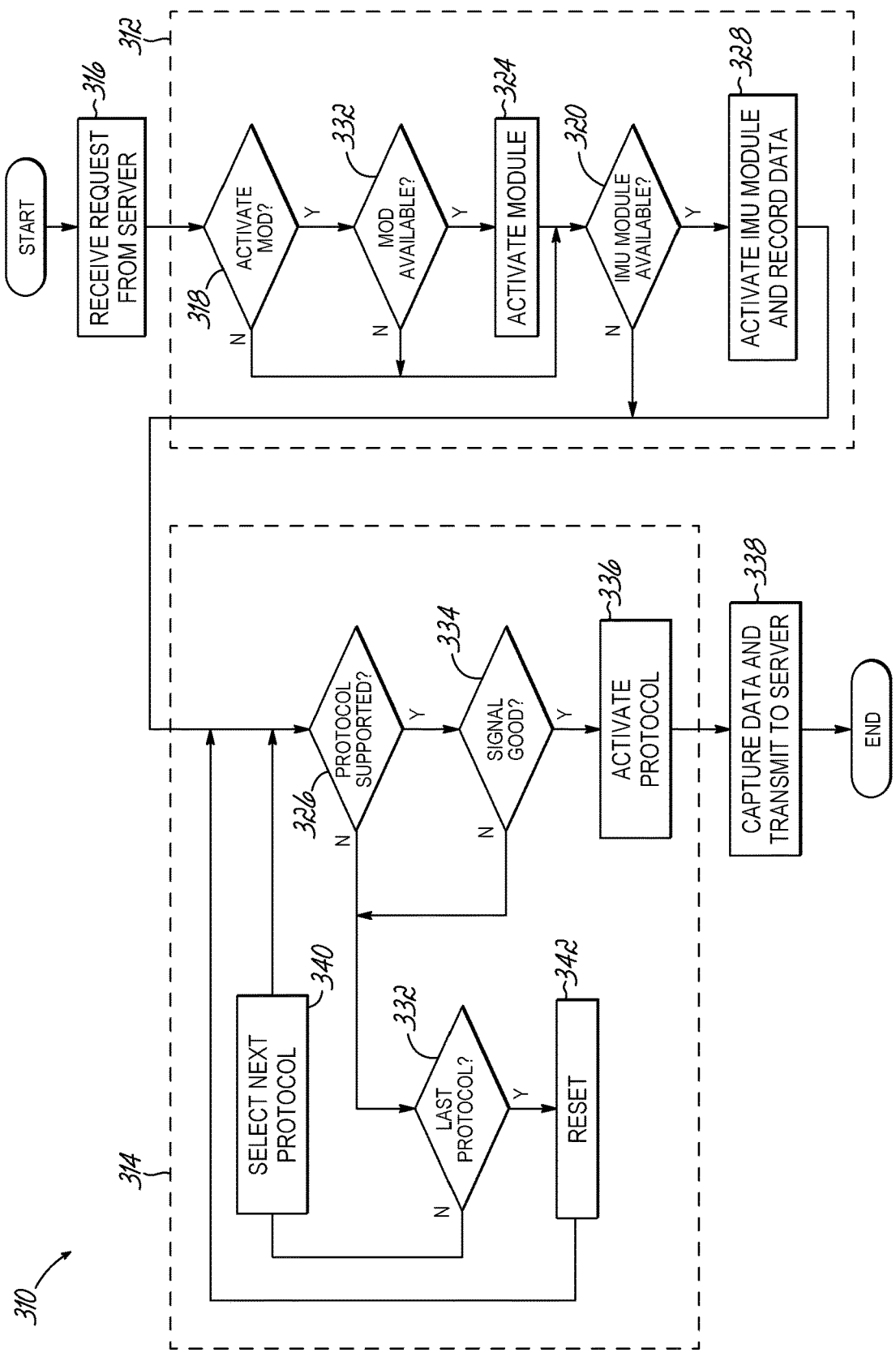

FIG. 14 depicts another exemplary process 310 that may be executed by one or more of the devices 240 and/or server 202 in accordance with an embodiment of the invention. The process 310 may include a module activation process 312 that implements instructions received from the server 202, and protocol selection process 314 that selects which communication protocol is used to generate tracking data.

In block 316, the process 310 may receive instructions from the server 202, e.g., to activate one or more modules and begin transmitting data generated thereby. Instructions to activate one or more modules may be transmitted to the device by the server 202 based on previously received tracking data, e.g., in response to the tracking data indicating that the device has moved outside of an allowed zone.

In response to receiving instructions from the server 202, process 310 may proceed to block 318 of process 312 and determine if the instructions require data from one or more modules, e.g., the camera 230, microphone 232, and/or one of the sensor modules 234a-224n. If the instructions do not require the device to provide data from a module ("NO" branch of decision block 318), the process 312 may proceed to block 320. If the instructions do require data from one or more modules ("YES" branch of decision block 318), the process 312 may proceed to block 322. In block 322, the process 312 may determine if the module(s) in question (e.g., the camera 230 and microphone 232) are present in the device. If the module(s) are present ("YES" branch of decision block 322), the process 312 may proceed to block 324, activate the module(s), and continue to block 320.

In block 320, the process 312 may determine if the device includes an IMU module 224. If the device does not include an IMU module 224 ("NO" branch of decision block 320), the process 312 may proceed to block 326 of process 314. If the device does include an IMU module ("YES" branch of decision block 320), the process 312 may proceed to block 328, activate the IMU module 224, begin recording movement data provided by the IMU module 224, and continue to block 326 of process 314.

Figure 15:
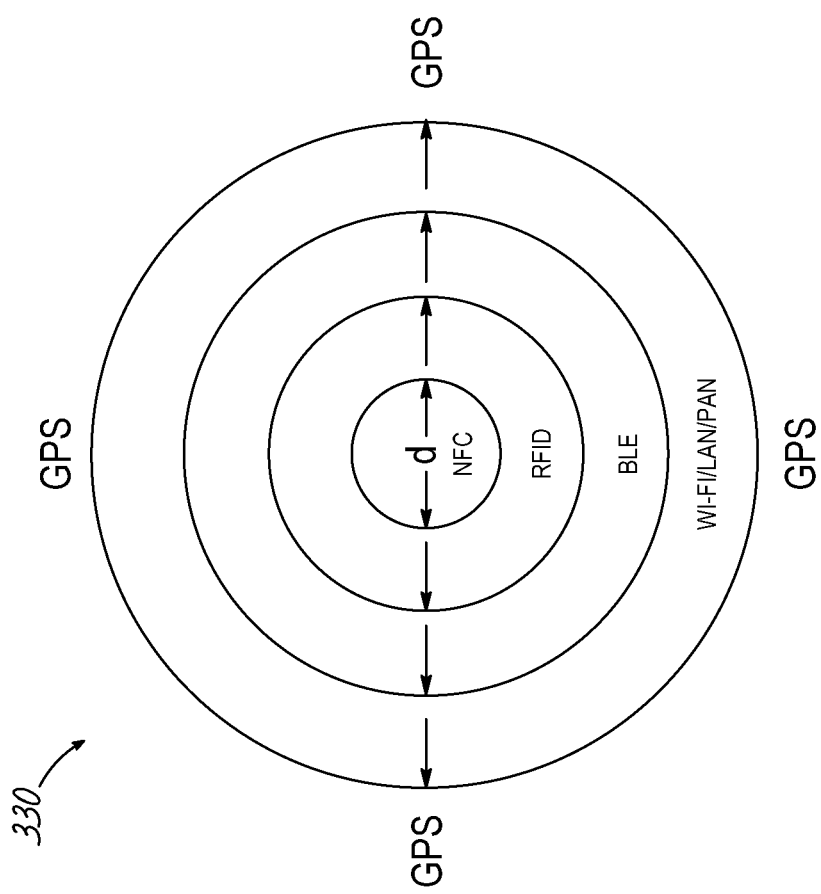
FIG. 15 is a diagrammatic view of a communication protocol selection hierarchy that may be used by the security system of FIG. 10 to select a communication protocol for determining position data.

The selection process 314 may follow a hierarchy in which certain communication protocols have preference over others. The hierarchy may be implemented by the order in which communication protocols are evaluated by the selection process 312. This order may be based on one or more priorities set by the system, such as conserving power, maintaining accuracy of the tracking data, etc. These priorities may vary depending on the scenario under which the device, a group of devices with which the device is associated, and/or the server 220 is operating. For example, the priorities may change from power conservation to tracking accuracy in response to the device transmitting a notification signal 26. FIG. 15 depicts an exemplary hierarchy 330 that may be implemented to minimize the power used by the device, where d is a maximum distance from the device at which the communication protocol can be used to determine a location relative to another device. To this end, the hierarchy 330 may prefer communication protocols that operate over a relatively short distance. In addition to being less energy intensive, communication protocols that operate over a short distance may in some cases provide more accurate distances relative to the devices they are receiving signals from. As depicted in FIG. 15, the order of preference for a set of exemplary communication protocols may be NFC, RFID, BLE, Wi-Fi, and GPS.

Returning to FIG. 14, in block 326, the process 314 may determine if the device supports a most preferred communication protocol (e.g., NFC), if the device does not support the communication protocol ("NO" branch of decision block 326), the process 314 may proceed to block 332. If the device does support the communication protocol ("YES" branch of decision block 326), the process 314 may proceed to block 334, activate a module that implements the communication protocol (e.g., an NFC module), and determine if a signal received by the module is "good", e.g., has sufficient strength to communicate and/or determine a position of the device. If the signal is good ("YES" branch of decision block 334), the process 314 may proceed to block 336, select the communication protocol for use by the device, and proceed to block 338. If the signal is not good ("NO" branch of decision block 334), the process 314 may proceed to block 332.

In block 332, the process 314 may determine if the previously evaluated communication protocol is the last communication protocol (i.e., least preferred) as defined by the hierarchy 330 (e.g., GPS). If the previously evaluated communication protocol is not the last communication protocol defined by the hierarchy 330 ("NO" branch of decision block 332), the process 314 may proceed to block 340, select the next communication protocol to evaluate as defined by the hierarchy 330 (e.g., RFID), and return to block 326. If the previously evaluated communication protocol is the last communication protocol defined by the hierarchy 330 ("YES" branch of decision block 332), the process 314 may proceed to block 342, reset the communication protocol selection list to the most preferred, and return to block 326 to repeat the protocol selection process.

In block 338, the process 310 may generate tracking data using the communication protocol selected by the protocol selection process 314. The tracking data may be relative to another device and/or a stationary frame of reference, or may be absolute in nature, and may be determined using signal strength, multilateration, and/or any other suitable combination of signal properties and navigation algorithms. As the tracking data is determined, the process may transmit the tracking data, as well as data generated by any modules activated by process 312, to the server 202.

Figure 16:
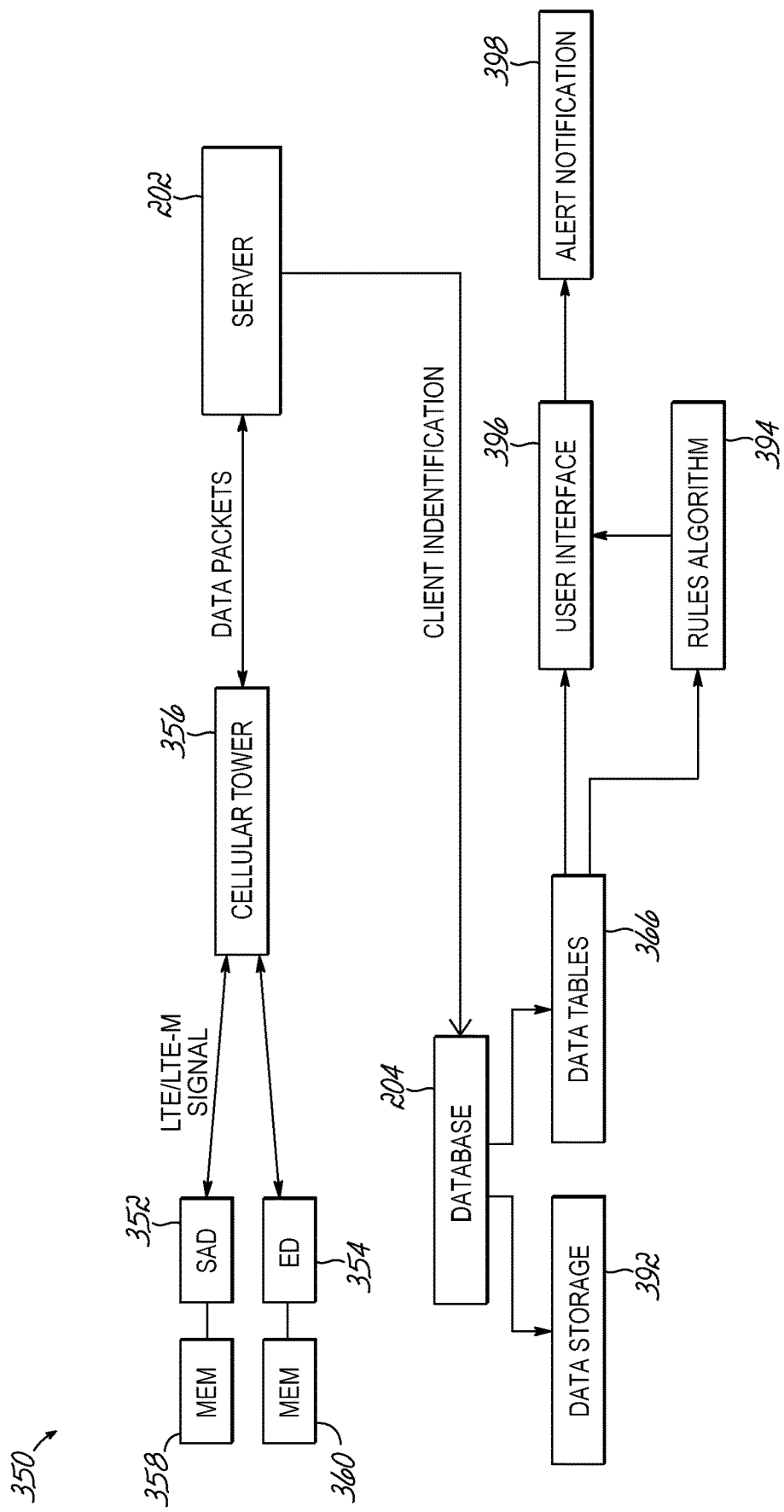
FIG. 16 is a diagrammatic view of a security system showing communication between the devices, server, and database via a wireless system.

FIG. 16 illustrates an exemplary security system 350 in accordance with an embodiment of the invention including a stand-alone device 352 and an electronic device 354. Each of the devices 352, 354 may exchange data packets with the server 202 through a cellular tower 356 using a suitable communication protocol, e.g., LTE. The data transmitted by the devices 352, 354 may include position data, movement data, environmental data (e.g., received from sensors integrated with or attached to the respective device), and/or device status data. Data may be stored in a local memory 358 of stand-alone device 352 and a local memory 360 of electronic device 354, respectively. The data received by the devices 352, 354 from the server 202 may include software updates, alert signals, warnings, and/or instructions to change the functions and/or settings of the devices 352, 354. Changes to the functions and/or settings may include changing the type of data received and transmitted, the rate at which data is received and transmitted, internal memory storage settings, instructions for the device to execute a program or enter a mode of operation, (e.g., to 'sleep' to conserve batter life, to reboot the device's software, run diagnostic testing, etc.).

Should a device 352, 354 lose its connection to the cellular tower 356, unsent data packets may be stored in the local memory 358, 360 of the respective device 352, 354 for transmission to the server 202 when the respective device reestablishes a connection with the cellular tower 356. In the event one or more data packets are not received by server 202, the device 352, 354 may re-send the missing data to the server 202 upon receiving a request for the missing data packets. If the connection between a stand-alone device 352 or electronic device 354 cannot be re-established, the unsent data packets in the local memory may be downloaded from the device and transmitted to server 202 by other means, e.g., via a serial port. In any case, the devices 352, 354 may determine their positions and store tracking data independent of a connection to cellular tower 356.

Figure 17:
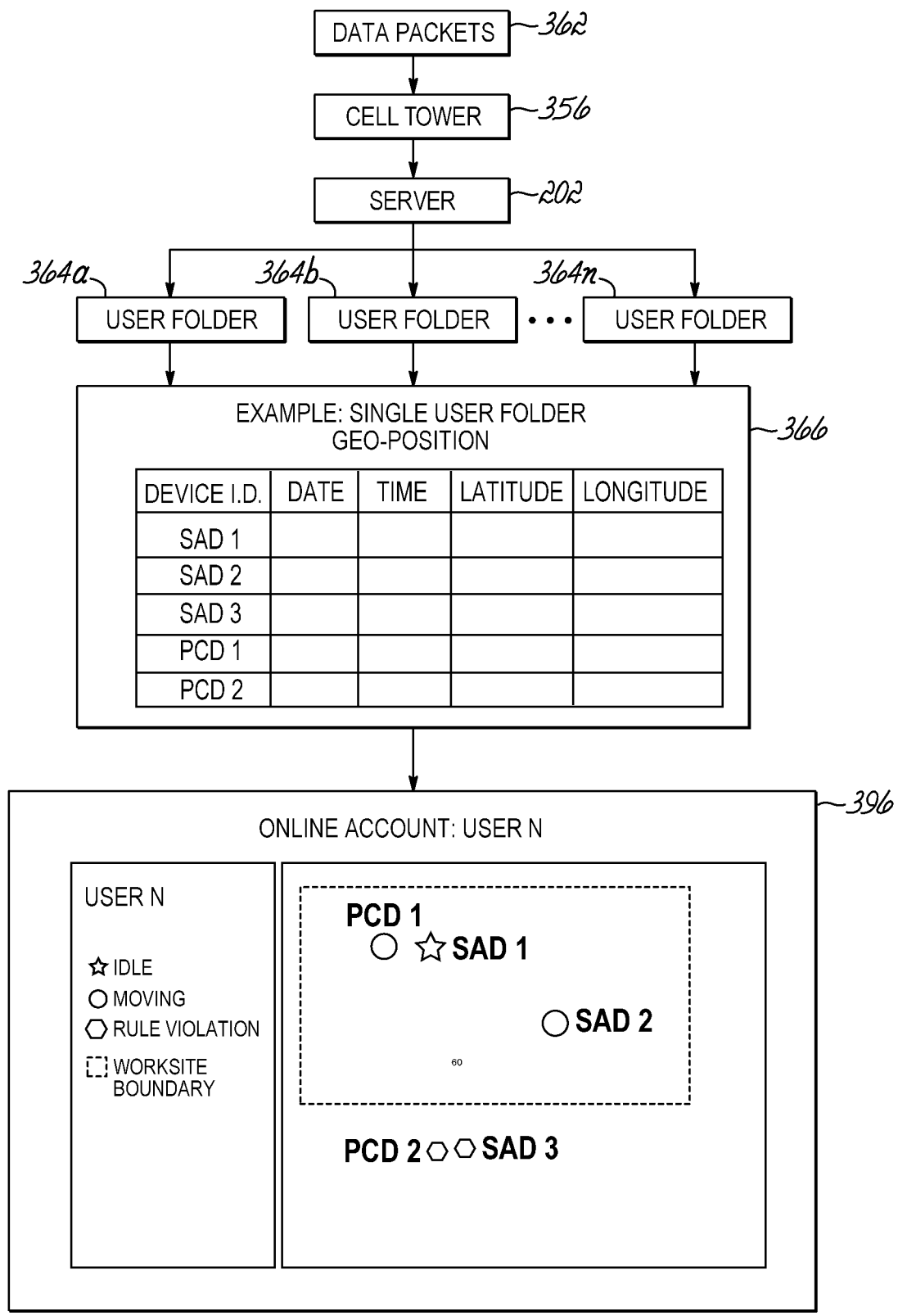
FIG. 17 is a diagrammatic view of an exemplary database table and user interface that may be employed by the security system of FIG. 16.
Figure 18:
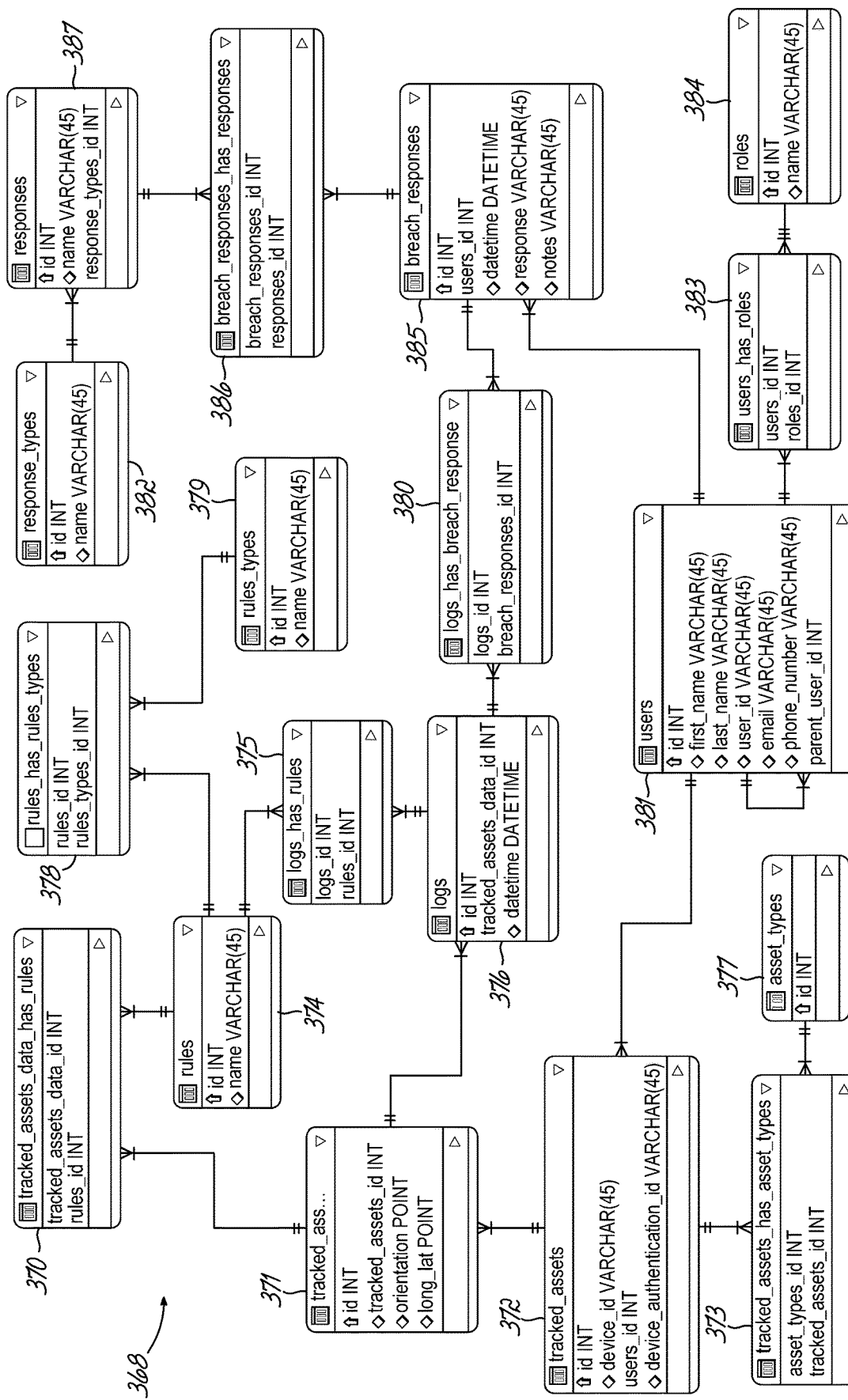
FIG. 18 is a diagrammatic view of interconnected data objects that may define a database table which may be employed by the security system of FIG. 16.

Referring to FIG. 17, the server 202 may receive the data packets 362 transmitted from the devices through the cellular tower 356, and sort the packets using the user identification information disclosed in the packet's header. The data packets may be indexed to a user folder 364a-364n corresponding to the user. The sever 202 may store data contained in the data packets in the database 204 for processing. The server 202 may interface with the database 204 by extracting the information in each data packet. The server 202 may read, sort, and write the information contained in each data packet into data records indexed by data tables 366. FIG. 18 depicts an entity relationship diagram that defines at least a portion of an exemplary data table 368. The data table 368 may include a plurality of interconnected objects 370-387. Each of the objects 370-387 may include attributes, and may be linked to other objects with which it is related.

If a user has more than one stand-alone device 352 and/or electronic device 354 connected to the server 202 on a single account, the data tables 366 may separate the data from the stand-alone devices 352 and/or electronic devices 354 associated to the user, e.g., as illustrated in FIG. 17. Data stored in or indexed by the data tables 366 may include, but is not limited to, tracking, environmental, and device status data of each individual device 352, 354. This data may be arranged in the data tables 366 for each user in chronological order of the timestamp generated by the device transmitting the data or at the server 202, which may be synchronized using GPS. The data packets for any additional sensors may be processed and written in a similar manner to a data table 366 to accomplish a similar goal of processing, writing and storing the information transmitted by each stand-alone device 352 or electronic device 354.

Once the data is sorted and written into the data tables 366, the data may be archived in long-term data storage 392. Archival may be in the same format as the data tables 366. The data may also be archived in other storage devices, i.e., data centers, remote cloud-based server, etc., in addition to the server 202, for a duration determined by the owner of the data. To determine if a threshold condition has been violated, the data may be processed using a rules algorithm module 394. The output of the rules algorithm module 394 may be displayed on a user interface 396, which may be a web-based interface provided by an application running on the user device. The system user may select and/or define the rule algorithms that define the threshold conditions by interacting with the user interface 396. When a threshold condition defined in the rules algorithm module 394 is violated, an alert notification 398 may be generated and forwarded to a responder and/or displayed by the user interface 396.

The system user may actively monitor the user interface 396 to determine the geographic location of a monitored device, a group of devices, a positional relationship between two or more devices within group of devices, a positional relationship between two or more groups of devices, etc., for compliance with the threshold conditions. This may allow the system user to determine when a threshold condition is about to be violated instead of waiting for notification signal to be generated. The system user may also view historical positional or sensory data for one or more devices via user interface 396.

Figure 19:
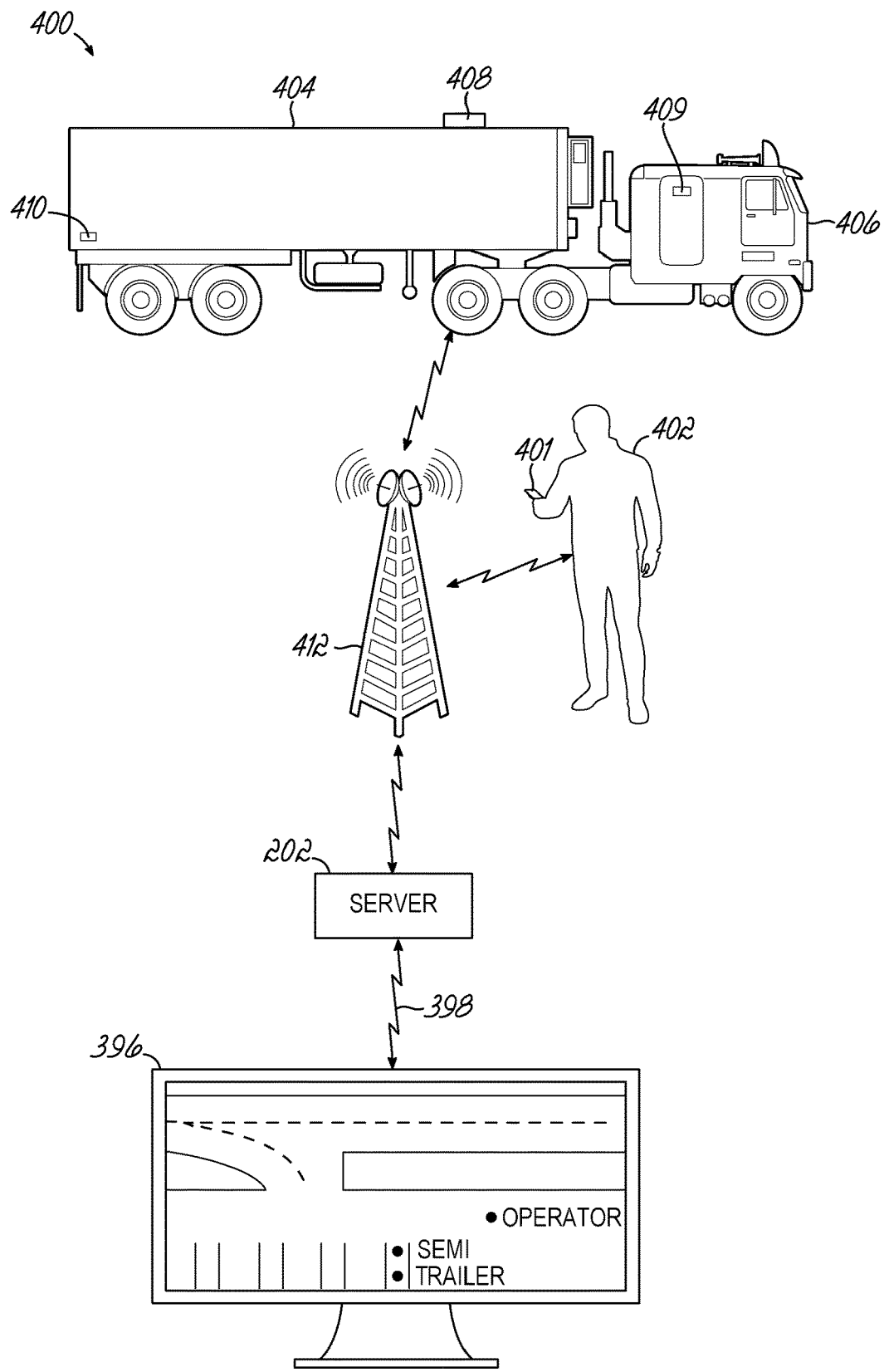
FIG. 19 is a diagrammatic view of an exemplary operational environment of the security system of FIG. 10 or 16.

FIG. 19 illustrates an exemplary operating environment 400 for the security system in accordance with an embodiment of the invention. An electronic device 401 (e.g., a smart phone) carried by a driver 402 may be linked to one or more of a trailer 404, a tractor 406, or cargo in the trailer by a like number of stand-alone devices 408-410. The stand-alone devices 408-410 may operate on their own internal power supply, or be connected to external power supply such as an electrical port or auxiliary power connector in the trailer 404 or tractor 406. The stand-alone devices 408-410 may transmit their geographic location and/or sensor data to the server 202 in real time. This data may allow the server 202 to determine the existence of one or more conditions, such as position, movement (speed, truck in motion, truck at a standstill, reckless operation), environmental conditions, and/or device status.

Based on the determined conditions, the server 202 may further determine if any of the threshold conditions have been violated. If a threshold condition has been violated, the server 202 may transmit an alert notification to one or more responders (which may include the driver 402, and/or the trucking company). The alert notification may include or be followed by predetermined instructions, cargo instructions, route changes necessary (e.g., due to weather, road closings, accidents, delays), and/or identification of safety violations (e.g., hours of service, speed, pre-trip, in transit, or post-trip inspections). The electronic device 401 and stand-alone devices 408-410 may send and receive data packets from the server 202 via a cellular tower 412.

The electronic device 401 and stand-alone devices 408-410 may be assigned to a group by the system user to monitor the driver 402, trailer 404, tractor 406, and any cargo. The positional relationships between the devices in the group may be used to monitor the tractor-trailer. The tractor-trailer may be scheduled to depart from a starting location (e.g., Dayton, Ohio) and scheduled to arrive at a destination (e.g., Bakersfield, California) a predetermined amount of time later (e.g., three days) to pick up a load and return to the starting location. The trucking company and/or purchaser of the cargo may be alerted if any threshold conditions established for monitoring the driver, tractor-trailer, and/or cargo are violated. Thresholds set for speed, elevation, route departure or environmental conditions may be monitored.

Advantageously, this real-time monitoring may enable issues that arise during transit to be handled before they evolve into more serious problems. For example, an alert signal may be sent to a responder if a threshold condition related to an amount of distance allowed between the driver and the tractor or trailer, and/or the amount of distance between the cargo and the trailer, or any combination thereof, is violated. Other exemplary threshold conditions may include hours of service, inspections, delivery confirmation, billing confirmation, etc.

Embodiments of the invention may facilitate monitoring and scheduling of routine maintenance (e.g., lubrication, fluid changes, tire rotation, part replacement) for equipment or vehicles via a predetermined set of rules. The rules may be related to an asset assigned to at least one electronic device or stand-alone device, and may consider the movement or non-movement of the asset. This may include time of operation or non-operation of an asset, including the time between action and inaction of the asset, the distance of travel or movement of the asset over a predetermined interval, route deviation, acceleration, deceleration and environmental conditions (changes in humidity, elevation, solar radiation, wind exposure, and/or atmospheric pressure).

Embodiments of the invention may include monitoring, tracking, and locating of animals (e.g., cattle, birds, mammals) individually or in groups of one or more species, to understand migratory patterns and routes, location, illness, behavior, abnormal activity, mortality, threats (natural or otherwise) to the animal associated with the stand-alone device or electronic device. The historical data or pattern of a single member of a group may be compared to the real time positional data of one or more members, and an alert signal generated if a threshold tolerance is exceeded.

By way of example, a pregnant cow's real time positional data for an interval may be compared to historical positional data (e.g., same or previous season, month, hour of the day) of the cow, and/or the positional data of other members of the herd. This comparison may be use to define a threshold tolerance for deviations from historical movement to generate an alert signal at the onset of delivery to monitor the health of the cow and act to aid the cow if necessary. The real-time data might be compared to historical data to indicate the improved health of an animal without the need for human monitoring or oversight.

By way of another example, a sight impaired user may be associated with an electronic device that is linked to a public or private transportation system. Geo-position information may be transmitted via the electronic device, which may be connected to the user interface to the sight impaired user. The information may warn and/or instruct the sight impaired user over the positional relationship of the desired transportation vehicle. Additional information may be included such as anticipated time and location of arrival, cost for the transportation, information updates between the transportation vehicle and said impaired user as the destination is neared.

Figure 20:
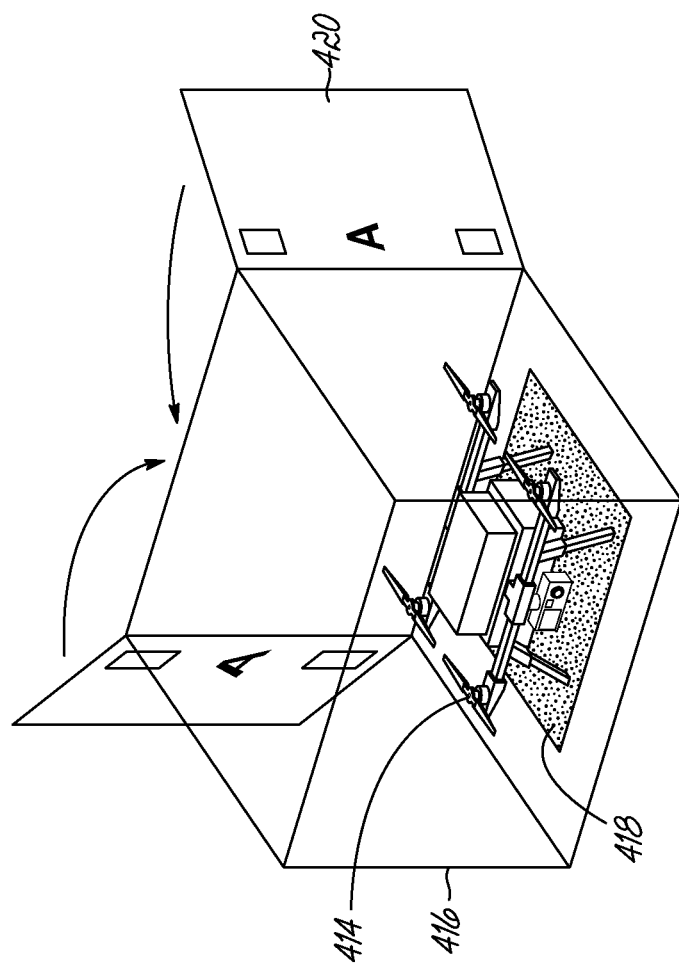
FIG. 20 is a diagrammatic view of a stand-alone device integrated with a drone.

FIG. 20 depicts an embodiment of the invention in which a stand-alone device is integrated with, or otherwise coupled to, an autonomous robot, such as a drone 414. The drone 414 may be housed in a weather-tight enclosure 416 that includes a docking station 418 which keeps the drone charged. The docking station 418 may receive power from the power grid, or may be self-powered, e.g., by solar cells and/or a wind turbine, so that the drone 414 can be located remotely. In response to determining a threshold condition has been violated, a node of the security system 200 (e.g., the server 202), may transmit a notification signal 26 to the stand-alone device of the drone 414. In response to receiving the notification signal 26, the stand-alone device may cause a door 420 of enclosure 416 to open, and launch the drone 414. The drone 414 may head for a location associated with the violation of the threshold condition, e.g., a site from which it is believed an asset is being stolen, the position of a moving vehicle that is outside its expected area of operation, or the location of an electronic device associated with a missing person.

Once aloft, the drone 414 may transmit video and/or other data to the server 202 and/or another system node so that it can be recorded in the database 204 and/or viewed live over the user interface 396. In the case of a moving asset, a stand-alone device attached to the asset may transmit its location to the server 202. The server 202 may in turn transmit this location to the stand-alone device of the drone so that the drone 414 can follow the asset until the situation is resolved. The stand-alone unit of the drone 414 may transmit tracking, environmental, device status, and drone status data to the server 202. The drone status data may include a level of charge in the power supply of the drone 414. In cases of an extended deployment of the drone 414, the power supply of the drone may become depleted. In response to receiving data that indicates the power supply of the drone 414 is running low, the server 202 or other system node may transmit a notification signal to another drone in the area to take over monitoring of the asset so that the drone running low on power can return to its base, or land in a safe area where it can be recovered.

As another example of a use for the drone 414, a cattle rancher may use the drone 414 to locate a herd of cattle or member of the heard for any purpose, including, monitoring, feeding, etc. To this end, stand-alone devices may be coupled to members of the heard to enable the drone 414 to quickly locate the heard and/or a member of the heard. Information provided by the drone 414 may allow the rancher to determine the amount of food, water, or other resource levels available to the heard.

The drone 414 may also be useful for home or office security. For example, when a rule violation occurs (e.g., when TV, computer, watch or tablet is moved beyond tan allowed area, e.g., the boundary of the property where the asset is kept), the drone 414 may be instructed to take flight and observe the outside of the home or office. The drone may stream video to a responder using a cellular or other data network, with the option to record the video stream locally or in the database 204 to later identify the person(s) or vehicle moving the asset.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, web based services, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general-purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A security system for securing a device or an asset attached thereto, the security system comprising:
   a first device configured to:
      determine a position of the first device,
      determine if the position of the first device causes a violation of a threshold condition, and
      in response to the position of the first device causing the violation of the threshold condition, transmit a first signal; and
   a second device in communication with the first device and configured to:
      receive the first signal, and
      generate a second signal in response to receiving the first signal,
   wherein the second device is one of a plurality of second devices, and each of the plurality of second devices is in communication with the first device with the same configuration, and
   wherein the second device communicates with the first device with a communication protocol, the communication protocol being one of a plurality of selectable communication protocols, and wherein the threshold condition adjusts based on the selection of the communication protocol, and
   wherein the second device comprises an autonomous robot that is configured to move toward the position of the first device in response to the violation of the threshold condition.

2. The system of claim 1 wherein the position of the second device is determined with respect to the position of the first device, or with respect to a fixed position.

3. The system of claim 1 wherein the threshold condition comprises the first device being outside of a first predetermined area, crossing a virtual boundary, being within a second predetermined area, being more than a predetermined distance from the second device, or movement of the first device in combination with the first device being more than the predetermined distance from the second device.

4. The system of claim 3 wherein the predetermined distance from the second device is determined based at least in part on whether the first device is in a safe zone.

5. The system of claim 3 wherein the second predetermined area is downloaded from a database of prohibited areas from which the first device is to be excluded.

6. The system of claim 1 wherein the second device is an electronic device carried by a user of the first device.

7. The system of claim 1 wherein the first device is one of a plurality of first devices in communication with the second device, and the second device generates the second signal in response to receiving the first signal from any of the first devices.

8. The system of claim 1 wherein the first device is configured to collect environmental data in response to the violation of the threshold condition.

9. The system of claim 8 wherein the environmental data includes an image of an area proximate to the first device.

10. The system of claim 1 wherein the first signal includes instructions for responding to the second signal.

11. The system of claim 1 wherein, in response to not receiving a third signal from the second device within a response interval, the first device transmits the first signal to a third device.

12. The system of claim 1 wherein the first device transmits the first signal to the second device through a network.

13. A method of securing a device or an asset attached thereto, the method comprising:
   determining, by a first device, a position of the first device;
   determining, by the first device, if the position of the first device causes a violation of a threshold condition;
   in response to the position of the first device causing the violation of the threshold condition, transmitting, by the first device, a first signal to a second device;
   in response to receiving the first signal at the second device, generating, by the second device, a second signal,
   wherein the second device is one of a plurality of second devices, and each of the plurality of second devices is in communication with the first device with the same configuration, and
   wherein the second device communicates with the first device with a communication protocol, the communication protocol being one of a plurality of selectable communication protocols, and wherein the threshold condition adjusts based on the selection of the communication protocol, and
   wherein the second device comprises an autonomous robot that is configured to move toward the position of the first device in response to the violation of the threshold condition.

14. The method of claim 13 wherein the first device is one of a plurality of first devices in communication with the second device, and the second device generates the second signal in response to receiving the first signal from any of the first devices.

15. The method of claim 13 further comprising:
   collecting, by the first device, environmental data in response to the violation of the threshold condition.

16. The method of claim 13 further comprising:
   in response to not receiving a third signal from the second device within a response interval, transmitting the first signal to a third device.

17. The method of claim 13 wherein the first device transmits the first signal to the second device through a network.

18. A computer program product for securing a device or an asset attached thereto, the computer program product comprising:
   a non-transitory computer readable storage medium containing program code that, when executed by one or more processors, causes the one or more processors to:
   determine a position of a first device;
   determine if the position of the first device causes a violation of a threshold condition;
   in response to the position of the first device causing the violation of the threshold condition, transmit a first signal to a second device;
   in response to receiving the first signal at the second device, generate a second signal,
   wherein the second device is one of a plurality of second devices, and each of the plurality of second devices is in communication with the first device with the same configuration, and
   wherein the second device communicates with the first device with a communication protocol, the communication protocol being one of a plurality of selectable communication protocols, and wherein the threshold condition adjusts based on the selection of the communication protocol, and
   wherein the second device comprises an autonomous robot that is configured to move toward the position of the first device in response to the violation of the threshold condition.

19. A security system for securing a device or an asset attached thereto, the security system comprising:
   a first device configured to:
      determine a position of the first device,
      determine if the position of the first device causes a violation of a threshold condition, and
      in response to the position of the first device causing the violation of the threshold condition, transmit a first signal; and
   a second device in communication with the first device and configured to:
      receive the first signal, and generate a second signal in response to receiving the first signal,
   wherein the threshold condition comprises the first device being outside of a first predetermined area, crossing a virtual boundary, being within a second predetermined area, being more than a predetermined distance from the second device, or movement of the first device in combination with the first device being more than the predetermined distance from the second device, and
   wherein the second device communicates with the first device with a communication protocol, the communication protocol being one of a plurality of selectable communication protocols, and wherein the threshold condition adjusts based on the selection of the communication protocol, and
   wherein the second device comprises an autonomous robot that is configured to move toward the position of the first device in response to the violation of the threshold condition.

20. The system of claim 19 wherein the position of the second device is determined with respect to the position of the first device, or with respect to a fixed position.

21. The system of claim 19 wherein the predetermined distance from the second device is determined based at least in part on whether the first device is in a safe zone.

22. The system of claim 19 wherein the second predetermined area is downloaded from a database of prohibited areas from which the first device is to be excluded.

23. The system of claim 19 wherein the second device is an electronic device carried by a user of the first device.

24. The system of claim 19 wherein the first device is one of a plurality of first devices in communication with the second device, and the second device generates the second signal in response to receiving the first signal from any of the first devices.

25. The system of claim 19 wherein the first device is configured to collect environmental data in response to the violation of the threshold condition.

26. The system of claim 25 wherein the environmental data includes an image of an area proximate to the first device.

27. The system of claim 19 wherein the first signal includes instructions for responding to the second signal.

28. The system of claim 19 wherein, in response to not receiving a third signal from the second device within a response interval, the first device transmits the first signal to a third device.

29. The system of claim 19 wherein the first device transmits the first signal to the second device through a network.

* * * * *